(12) United States Patent
Ma et al.

(10) Patent No.: US 10,859,384 B2
(45) Date of Patent: Dec. 8, 2020

(54) LIGHTWEIGHT VEHICLE LOCALIZATION SYSTEMS AND METHODS

(71) Applicant: UATC, LLC, San Francisco, CA (US)

(72) Inventors: Wei-Chiu Ma, Toronto (CA); Shenlong Wang, Toronto (CA); Namdar Homayounfar, Toronto (CA); Shrinidhi Kowshika Lakshmikanth, Toronto (CA); Raquel Urtasun, Toronto (CA)

(73) Assignee: UATC, LLC, San Francisco, CA (US)

( * ) Notice: Subject to any disclaimer, the term of this patent is extended or adjusted under 35 U.S.C. 154(b) by 131 days.

(21) Appl. No.: 16/123,289

(22) Filed: Sep. 6, 2018

(65) Prior Publication Data

US 2019/0145784 A1 May 16, 2019

Related U.S. Application Data

(60) Provisional application No. 62/586,759, filed on Nov. 15, 2017.

(51) Int. Cl.
*G01C 21/00* (2006.01)
*G01C 21/10* (2006.01)
(Continued)

(52) U.S. Cl.
CPC ........... *G01C 21/32* (2013.01); *G01C 21/005* (2013.01); *G05D 1/0088* (2013.01);
(Continued)

(58) Field of Classification Search
CPC ...... G01C 21/32; G01C 21/005; G01C 21/10; G06F 16/29; G06T 7/74;
(Continued)

(56) References Cited

U.S. PATENT DOCUMENTS

| 10,621,495 B1 * | 4/2020 | Huval | G06K 9/00791 |
|---|---|---|---|
| 2014/0114563 A1 * | 4/2014 | Newson | G01C 21/3484 |
| | | | 701/411 |

(Continued)

FOREIGN PATENT DOCUMENTS

WO WO2016130719 8/2015

OTHER PUBLICATIONS

Baatz, G. et al., "Leveraging 3D City Models for Rotation Invariant Place-of-Interest Recognition", International Journal of Computer Vision, 2012.

(Continued)

*Primary Examiner* — Behrang Badii
*Assistant Examiner* — Hossam M Abd el Latif
(74) *Attorney, Agent, or Firm* — Dority & Manning, P.A.

(57) ABSTRACT

Systems and methods for autonomous vehicle localization are provided. In one example embodiment, a computer-implemented method includes obtaining, by a computing system that includes one or more computing devices onboard an autonomous vehicle, sensor data indicative of one or more geographic cues within the surrounding environment of the autonomous vehicle. The method includes obtaining, by the computing system, sparse geographic data associated with the surrounding environment of the autonomous vehicle. The sparse geographic data is indicative of the one or more geographic cues. The method includes determining, by the computing system, a location of the autonomous vehicle within the surrounding environment based at least in part on the sensor data indicative of the one or more geographic cues and the sparse geographic data. The method includes outputting, by the computing system, data indicative of the location of the autonomous vehicle within the surrounding environment.

17 Claims, 8 Drawing Sheets

(51) Int. Cl.
    *G01C 21/32* (2006.01)
    *G05D 1/00* (2006.01)
    *G06F 16/29* (2019.01)
    *G05D 1/02* (2020.01)
    *G06K 9/00* (2006.01)
    *G06T 7/73* (2017.01)

(52) U.S. Cl.
    CPC ........... *G05D 1/0246* (2013.01); *G06F 16/29* (2019.01); *G06K 9/00798* (2013.01); *G06T 7/74* (2017.01); *G01C 21/10* (2013.01); *G05D 2201/0213* (2013.01); *G06T 2207/30244* (2013.01); *G06T 2207/30252* (2013.01)

(58) Field of Classification Search
    CPC  G06T 2207/30252; G06T 2207/30244; G06K 9/00798; G05D 1/0246; G05D 1/0088; G05D 2201/0213
    USPC .......................................................... 701/448
    See application file for complete search history.

(56) References Cited

U.S. PATENT DOCUMENTS

| | | | | |
|---|---|---|---|---|
| 2015/0233720 | A1* | 8/2015 | Harada | G01C 21/30 |
| | | | | 701/409 |
| 2017/0010104 | A1* | 1/2017 | Aviel | B60W 30/18 |
| 2019/0137290 | A1* | 5/2019 | Levy | G01C 21/3461 |
| 2019/0243372 | A1* | 8/2019 | Huval | G08G 1/167 |

OTHER PUBLICATIONS

Bai, M., et al. "Exploiting Semantic Information and Deep Matching for Optical Flow", arXiv: 1604.01827v2 [cs.CV], 2016.
Bansal, M. et al., "Geometric Urban Geolocalization", Computer Vision and Pattern Recognition, 2014.
Brubaker, M. et al., "Lost! Leveraging the Crowd for Probabilistic Visual Self-Localization", Computer Vision and Pattern Recognition, 2013.
Chaurasia, A. et al., "Linknet: Exploiting Encoder Representations for Efficient Semantic Segmentation", 2017.
Chen, Z., et al., "A Deep Visual Correspondence Embedding Model for Stereo Matching Costs", International Conference on Computer Vision, 2015.
Cummins, M. et al., "Fab-map: Probabilistic Localization and Mapping in the Space of Appearance", The International Journal of Robotics research, 2008.
Dewri, R., et al., "Inferring Trip Destinations from Driving Habits Data", Colorado Research Institute for Security and Privacy.
Engel, J. et al., "Lsd-slam: Large Scale Direct Monocular Slam", European Conference on Computer Vision, 2014.
Floros, G. et al., "OpenStreetSlam: Global Vehicle Localization Using OpenStreetMaps", International Conference on Robotics and Automation, 2013.
Han, X. et al., "Matchnet: Unifying Feature and Metric Learning for Patch-based Matching", Computer Vision and Pattern Recognition, 2015.
Hays, J. et al., "im2gps: Estimating Geographic Information from a Single Image", Computer Vision and Pattern Recognition, 2008.
Jaderberg, M. et al., "Spatial transformer Networks", Conference on Neural Information Processing Systems, 2015.
Kendall, A. et al., "Posenet: a Convolutional Network for Real-Time 6-dof Camera Relocalization", International Conference on Computer Vision, 2015.
Levinson, J., et al. "Map-Based Precision Vehicle Localization in Urban Environments", Stanford Artificial Intelligence Laboratory.
Levinson, J., et al. "Robust Vehicle Localization in Urban Environments Using Probabilistic Maps", International Conference on Robotics and Automation, 2010.
Li, Y. et al., "Worldwide Pose Estimation Using 3D Point Clouds", European Conference on Computer Vision, 2012.
Linegar, C. et al., "Work Smart, Not Hard: Recalling Relevant Experiences for Vast-Scale but time-Constrained Localisation", International Conference on Robotics and Automation, 2015.
Liu, L. et al., "Efficient Global 2D-3D Matching For Camera Localization in a Large-Scale 3D Map", International Conference on Computer Vision, 2017.
Long, J.L. et al., "Do Convnets Learn Correspondence?", Conference on Neural Information Processing Systems, 2014.
Luo, W. et al., "Efficient Deep Learning for stereo Matching", Computer Vision and Pattern Recognition, 2016.
Ma, W.-C. et al., "Find Your Way by Observing the Sun and Other Semantic Cues", arXiv PrePrint arXiv: 1606.07415, 2016.
Mattyus, G. et al., "Enhancing Road Maps by Parsing Aerial Images Around the World", International Conference on Computer Vision, 2015.
Mattyus, G. et al., "Hd Maps: Fine-Grained Road Segmentation by Parsing Ground and Aerial Images", Computer Vision and Pattern Recognition, 2016.
Matzen, K. et al., "Nyc3dcars: a Dataset of 3D Vehicles in Geographic Context", International Conference on Computer Vision, 2013.
Moosmann, F. et al., "Joint Self-Localization and Tracking of Generic Objects in 3D Range Data", International Conference on Robotics and Automation, 2013.
Mur-Artal, R. et al., "Orb-Slam: A Versatile and Accurate Monocular Slam System", IEEE Transactions on Robotics, 2015.
Nelson, P. et al., "From Dusk Till Dawn: Localisation at Night Using Artificial Light Sources", International Conference on Robotics and Automation, 2015.
Sattler, T. et al., "Fast Image-Based Localization Using Direct 2D-to-3D Matching", International Conference on Computer Vision, 2011.
Schreiber, M., et al. "LaneLoc: Lane Marking based Localization using Highly Accurate Maps", IEEE Intelligent Vehicle Symposium, 2013.
Seff, A. et al., "Learning from Maps: Visual Common Sense for Autonomous Driving", arXiv PrePrint arXiv: 1611:08583, 2016.
Shotton, J. et al., "Scene Coordinate Regression Forests for Camera Relocalization in rgb-d Images", Computer Vision and Pattern Recognition, 2013.
Wang, S., et al. "Autoscaler: Scale-Attention Networks for Visual Correspondence", arXiv: 1611.05837v1 [cs.CV], 2016.
Wang, S. et al., "Torontocity: Seeing the World with a Million Eyes", arXiv PrePrint arXiv1612: 00423, 2016.
Wang, S. et al., "Holistic 3D Scene Understanding from a Single Geo-Tagged Image", Computer Vision and Pattern Recognition, 2015.
Wang, S. et al., "Lost Shopping! Monocular Localization in Large Indoor Spaces", International Conference on Computer Vision, 2015.
Wegner, J.D. et al., "Cataloging Public Objects Using Aerial and Street-Level Images-Urban Trees", Computer Vision and Pattern Recognition, 2016.
Wojna, Z., et al. "The Devil is in the Decoder", arXiv:1707.05847v2 [cs.CV] Aug. 12, 2017.
Wolcott, R., et al. "Fast LIDAR Localization using Multiresolution Gaussian Mixture Maps".
Wolcott, R.W. et al., "Visual Localization Within Lidar Maps for Automated Urban Driving", International Conference on Intelligent Robots, 2014.
Yoneda, K., et al. "LIDAR Scan Feature for Localization with Highly Precise 3D Map", IEEE Intelligent Vehicles Symposium, 2014.
Zagomyko, S. et al., "Learning to Compare Image Patches via Convolutional Neural Networks", Computer Vision and Pattern Recognition, 2015.
Zbontar, J. et al., "Computing the Stereo Matching Cost with a Convolutional Neural Network", Computer Vision and Pattern Recognition, 2015.
Ziegler, J., et al. "Video Based Localization for BERTHA", IEEE Intelligent Vehicles Symposium, 2014.

(56) References Cited

OTHER PUBLICATIONS

Zhang, J. et al., "Loam: Lidar Odometry and Mapping in Real-Time", Journal of the Royal Statistical Society, 2014.
Zhou, T., et al. "Unsupervised Learning of Depth and Ego-Motion from Video", arXiv: 1704.07813v2 [cs.CV], 2017.
Zhou, T., et al. "View Synthesis by Appearance Flow", International Conference on Electrical Engineering and Computer Sciences, 2016.
International Search Report and Written Opinion for Application No. PCT/US2018/061219, dated Feb. 27, 2019, 12 pages.

* cited by examiner

LIGHTWEIGHT VEHICLE LOCALIZATION SYSTEMS AND METHODS

PRIORITY CLAIM

The present application is based on and claims priority to U.S. Provisional Application 62/586,759 having a filing date of Nov. 15, 2017, which is incorporated by reference herein.

FIELD

The present disclosure relates generally to improving the ability of an autonomous vehicle to determine its location within its surrounding environment and controlling the autonomous vehicle regarding the same.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for autonomous vehicle localization. The method includes obtaining, by a computing system that includes one or more computing devices onboard an autonomous vehicle, sensor data indicative of one or more geographic cues within a surrounding environment of the autonomous vehicle. The method includes obtaining, by the computing system, sparse geographic data associated with the surrounding environment of the autonomous vehicle. The sparse geographic data is indicative of the one or more geographic cues. The method includes determining, by the computing system, a location of the autonomous vehicle within the surrounding environment based at least in part on the sensor data indicative of the one or more geographic cues and the sparse geographic data. The method includes outputting, by the computing system, data indicative of the location of the autonomous vehicle within the surrounding environment.

Another example aspect of the present disclosure is directed to a computing system for autonomous vehicle localization. The computing system includes one or more processors and one or more tangible, non-transitory, computer readable media that collectively store instructions that when executed by the one or more processors cause the computing system to perform operations. The operations include obtaining sensor data indicative of one or more lane boundaries within a surrounding environment of the autonomous vehicle. The operations include obtaining sparse geographic data associated with the surrounding environment of the autonomous vehicle. The sparse geographic data includes a lane graph indicative of the one or more lane boundaries. The operations include determining a location of the autonomous vehicle within the surrounding environment based at least in part on the sensor data and the lane graph. The operations include outputting data indicative of the location of the autonomous vehicle within the surrounding environment.

Yet another example aspect of the present disclosure is directed to an autonomous vehicle. The autonomous vehicle includes one or more sensors, one or more processors, and one or more tangible, non-transitory, computer readable media that collectively store instructions that when executed by the one or more processors cause the autonomous vehicle to perform operations. The operations include obtaining, via the one or more sensors, sensor data indicative of one or more geographic cues within a surrounding environment of the autonomous vehicle. The operations include obtaining sparse geographic data associated with the surrounding environment of the autonomous vehicle. The operations include determining a location of the autonomous vehicle within the surrounding environment based at least in part on the sensor data indicative of the one or more geographic cues and the sparse geographic data. The operations include outputting data indicative of the location of the autonomous vehicle within the surrounding environment.

Other example aspects of the present disclosure are directed to systems, methods, vehicles, apparatuses, tangible, non-transitory computer-readable media, and memory devices for determining the location of an autonomous vehicle and controlling the autonomous vehicle with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
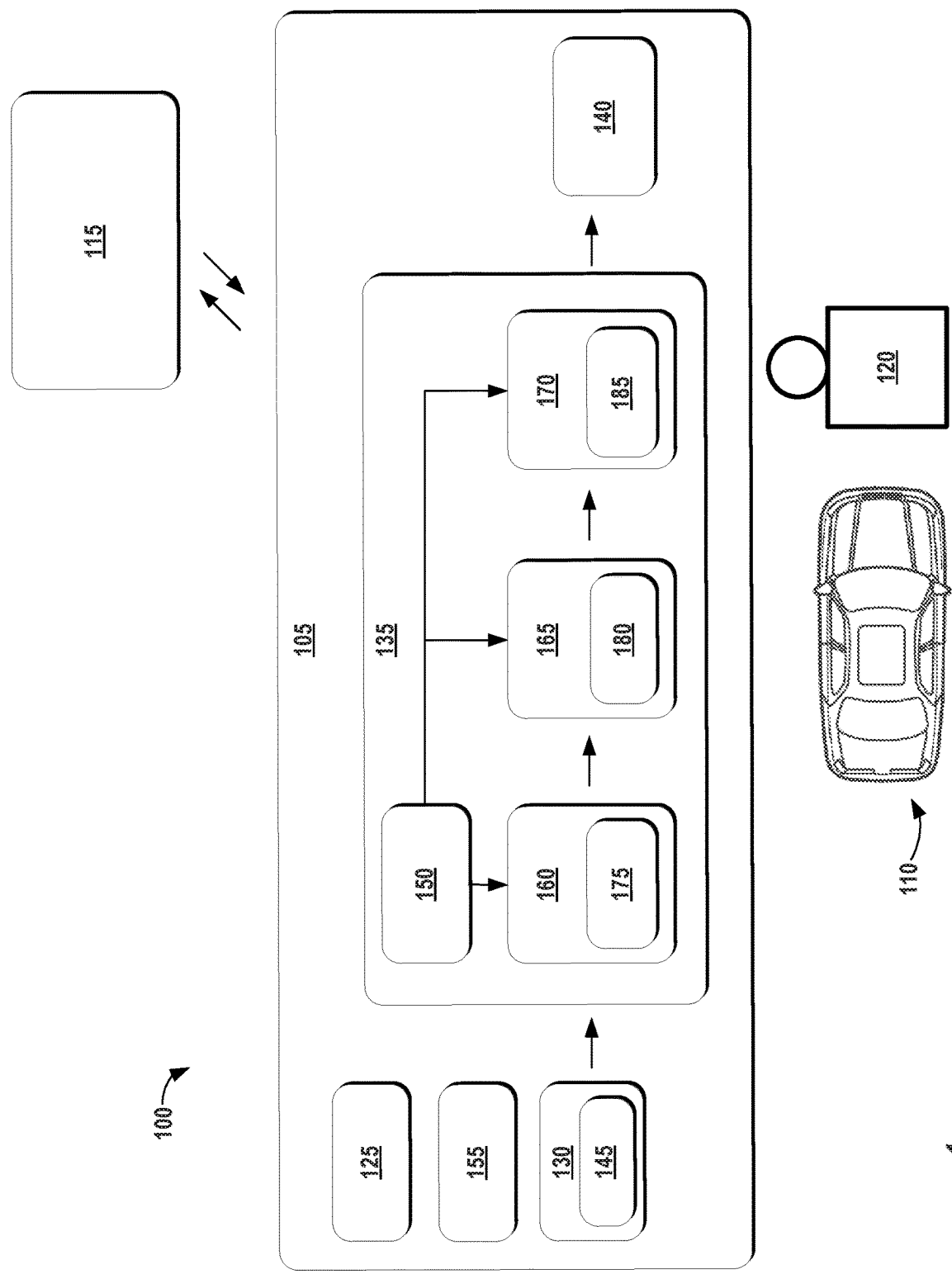
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to computationally lightweight localization of an autonomous vehicle within its surrounding environment. An autonomous vehicle can drive, navigate, operate, etc. with minimal and/or no interaction from a human driver. To do so, it is important for the autonomous vehicle to have an understanding of its position within the environment in which the vehicle is travelling. In some circumstances, the autonomous vehicle can utilize previously generated, detailed maps of previously travelled geographic areas to gain this positional understanding. Such an approach can produce very precise results, however it can be unreliable for new and/or modified geographic areas, while also utilizing significant computational resources.

The systems and methods of the present disclosure provide a more lightweight, computationally efficient technique for an autonomous vehicle to localize itself within its surrounding environment. For instance, an autonomous vehicle can obtain sensor data (e.g., LIDAR data, image data, etc.) indicative of one or more geographic cues (e.g., lane boundaries, etc.) within the vehicle's surrounding environment. The autonomous vehicle can also generate sparse geographic data associated with the surrounding environment. The sparse geographic data can be indicative of the one or more geographic cues. The sparse geographic data can be less comprehensive than, for example, detailed mapping data produced for a previously travelled area. By way of example, as further described herein, the sparse geographic data can include a lane graph that merely indicates the location of the lane boundaries of a travel way. The autonomous vehicle can compare the cue(s) in the sensor data (e.g., the position of the lane boundary markings) to the cue(s) in the sparse geographic data (e.g., the position of the lane boundaries in the lane graph) to determine a location of the autonomous vehicle within the surrounding environment (e.g., within a travel lane). In this way, the systems and methods described herein provide autonomous vehicles with a computationally lightweight approach to understanding its location where detailed map data may be unavailable and/or would be less useful. Moreover, this can allow an autonomous vehicle to efficiently determine its location for improved autonomous navigation through the vehicle's surrounding environment.

More particularly, an autonomous vehicle can be a ground-based autonomous vehicle (e.g., car, truck, bus, etc.) or another type of vehicle (e.g., aerial vehicle) that can operate with minimal and/or no interaction from a human operator. For example, an autonomous vehicle can include an onboard vehicle computing system for operating the vehicle (e.g., located on or within the autonomous vehicle). The vehicle computing system can receive sensor data from one or more sensors onboard the vehicle (e.g., a Light Detection and Ranging (LIDAR) system, a Radio Detection and Ranging (RADAR) system, one or more cameras, etc.), attempt to comprehend the vehicle's surrounding environment by performing various processing techniques on the sensor data, and generate an appropriate motion plan through the vehicle's surrounding environment. To help perform such operations, it is important that the autonomous vehicle understand its location within its surrounding environment. Accordingly, the vehicle computing system can include a lightweight localization system that is configured to determine the location of the autonomous vehicle within its surrounding environment The vehicle computing system (e.g., the lightweight localization system) can obtain sensor data indicative of one or more geographic cues within the surrounding environment of the autonomous vehicle. The sensor data can include, for example, LIDAR data acquired via the onboard LIDAR system of the autonomous vehicle and/or image data acquired via the onboard camera(s) of the autonomous vehicle. The geographic cue(s) can include various features within the surrounding environment of the autonomous vehicle. For instance, the geographic cues can include lane boundaries (e.g., markings indicative of lane lines, line segments, etc.), traffic signs, travel way curves (e.g., exit ramps, etc.), barriers (e.g., curbs, retaining walls, guard rails, etc.), bridges, and/or other types of features.

The vehicle computing system (e.g., the lightweight localization system) can generate sparse geographic data associated with the surrounding environment of the autonomous vehicle. Such data can be limited in that it omits several features that would be included in a more robust set of map data for an environment in which the autonomous vehicle is travelling. For instance, the sparse geographic data can be indicative of the one or more geographic cues that the lightweight localization system is using to determine the vehicle's location, while omitting the other features of the surrounding environment. By way of example, the sparse geographic data can be indicative of a lane graph associated with the surrounding environment of the autonomous vehicle. The lane graph can include a plurality of points and/or polylines that represent the location of lane boundaries within the vehicle's surrounding environment. Such a lane graph can be generated, for example, based on LIDAR lane detection techniques and/or two-dimensional optical lane detection data applied to a machine-learned model (e.g., a recurrent net) to draw out the points and/or polylines indicative of the lane boundaries. In some implementations, the vehicle computing system can obtain sparse geographic data that is generated from another computing system. For example, the vehicle computing system can obtain (e.g., from a local memory, remote computing system, etc.) spare geographic data that includes the one or more cues and no other features (or a limited number of additional features) of the environment in which the autonomous vehicle is travelling.

The vehicle computing system can crop the sparse geographic data into a sub-portion that corresponds to the portion of the geographic area in which the autonomous vehicle is located. For example, the vehicle computing system can obtain data indicative of one or more vehicle parameters associated with the autonomous vehicle. The vehicle parameter(s) can include dynamic parameters of the autonomous vehicle such as, for example, the vehicle's speed/velocity, acceleration, heading, etc. The vehicle computing system can determine a predicted location of the autonomous vehicle within the surrounding environment based at least in part on the one or more vehicle parameters. For example, the vehicle computing system can identify the vehicle's speed, heading, acceleration, etc. at a first time and interpolate where the autonomous vehicle will be at a future point in time based on such vehicle parameter(s). The vehicle computing system can identify a sub-portion of the sparse geographic data based at least in part on this predicted location of the autonomous vehicle. The vehicle computing system can crop the sparse geographic data (e.g., 200×200 meter lane graph) into the sub-portion (e.g., a 1.5×1.5 meter sub-lane graph) that corresponds to the predicted location of the autonomous vehicle. This can allow the vehicle computing system to focus its localization analysis on a sub-set of the sparse geographic data, thereby saving computational resources and increasing accuracy of its location determination.

The vehicle computing system can determine a location of the autonomous vehicle within the surrounding environment based at least in part on the sensor data indicative of the geographic cue(s) and the sparse geographic data. To do so, the vehicle computing system can transform the sensor data. For instance, the vehicle computing system can warp, rotate, translate, and/or otherwise transform the sensor data indicative of the geographic cue(s) to orient the geographic cue(s) in the sensor data (e.g., the lane boundaries) in a manner that allows for better matching with the geographic cue(s) of the sparse geographic data (e.g., the lane boundaries in the lane graph). The vehicle computing system can crop/segment the sensor data to reduce the portion of the sensor data and/or reduce the feature(s) indicated in the sensor data for a more focused analysis. In some implementations, the sensor data transformation can be done in an iterative manner to find the orientation (e.g., rotation and/or translation) that is most comparable to that of the sparse geographic data. The vehicle computing system can compare the transformed sensor data to the sparse geographic data (e.g., to the cropped sub-portion of the sparse geographic data) and determine the location of the autonomous vehicle based at least in part on such comparison.

By way of example, the vehicle computing system can warp the sensor data indicative of the lane boundaries into a format that is similar to the polylines of a lane graph. At a first iteration, the warped sensor data can be rotated one degree clockwise. At a second iteration, the warped sensor data can be rotated two degrees clockwise, and so forth. For each iteration, the vehicle computing system can compare the transformed sensor data to a sub-portion of the lane graph that corresponds to a predicted location of the vehicle. In doing so, the vehicle computing system can utilize the sparse geographic data (e.g., the sub-portion of the lane graph) as a filter and/or cross-correlation with the transformed sensor data. In some implementations, the vehicle computing system can utilize a fixed weight convolution technique to analyze the transformed sensor data relative to the sparse geographic data. The vehicle computing system can continue the iterative process until it determines that the transformed sensor data matches (e.g., beyond a confidence threshold) the sub-portion of the lane graph.

The vehicle computing system can determine a plurality of probabilities for a plurality of candidate locations of the autonomous vehicle within the surrounding environment based on this comparison. For example, the vehicle computing system can generate data (e.g., a heat map, score map, etc.) that indicates the respective probability that the autonomous vehicle is located at each candidate location of the plurality of different locations (e.g., within a travel lane). The vehicle computing system can determine the location of the autonomous vehicle by selecting the location from the plurality of candidate locations based on the plurality of probabilities. For example, the vehicle computing system can select the location with the highest probability, determine an average sum of the probabilities at two or more of the candidate locations, and/or employ other statistical analysis techniques to determine the location of the autonomous vehicle.

In some implementations, the vehicle computing system can include, employ, and/or otherwise leverage one or more machine-learned models to help determine the location of the autonomous vehicle within the surrounding environment. The machine-learned model(s) can be or can otherwise include various model(s) such as, for example, neural networks (e.g., deep neural networks), or other multi-layer non-linear models. Neural networks can include for example, convolutional neural networks, and/or other forms of neural networks. Training techniques can be performed (e.g., backwards propagation) to train the model(s) to transform sensor data and/or sparse geographic data. For example, the vehicle computing system can generate transformed sensor data based at least in part on the sensor data indicative of the geographic cue(s) and a first machine-learned model. The first machine-learned model can be a first convolution neural network that is configured to receive the sensor data as an input, transform the sensor data as described herein (e.g., warp, rotate, translate, etc.), and output the transformed sensor data (e.g., at several iterations). The vehicle computing system can generate transformed sparse geographic data based at least in part on the sparse geographic data indicative of the geographic cue(s) and a second machine learned model. The second machine-learned model can be a second convolutional neural network that is configured to receive the sparse geographic data (e.g., the lane graph) as an input, transform the sparse geographic data in manner that is better oriented with respect the transformed sensor data, and output the transformed sparse geographic data (e.g., at several iterations). The vehicle computing system can compare the transformed sensor data to the transformed sparse geographic data. The vehicle computing system can determine the location of the autonomous vehicle within the surrounding environment based on such comparison (e.g., when a match is found), in a manner similar to that described herein. The machine-learned models can help decrease number of iterations needed to match the data as the model(s) are trained and learn over time what orientations best produce a match. In some implementations, the machine-learned models can be trained on training data generated by implementations of the present disclosure described herein which do not include machine-learned models.

The vehicle computing system can output data indicative of the location of the autonomous vehicle within the surrounding environment. For instance, the lightweight localization system can provide data indicative of the location of the autonomous vehicle to one or more of the various sub-systems of the vehicle's autonomy system (e.g., the perception system, the prediction system, the motion planning system, etc.). The vehicle computing system can determine a motion plan for the autonomous vehicle based at least in part on the location of the autonomous vehicle within the surrounding environment. For example, the vehicle computing system can determine whether the vehicle needs to nudge left or right within its travel lane to avoid an obstruction (e.g., a pothole) based on the determined location of the autonomous vehicle within the travel lane. The vehicle computing system can cause the autonomous vehicle to initiate travel in accordance with at least a portion of the motion plan (e.g., to avoid the pothole).

The systems and methods described herein provide a number of technical effects and benefits. For instance, the present disclosure provides systems and methods for efficient and lightweight localization of an autonomous vehicle within the vehicle's surrounding environment. The systems and methods described herein allow the autonomous vehicle to quickly determine its location within its surrounding environment without having to rely on detailed and robust map data generated using previous driving log data. As such, the present disclosure improves the ability of the autonomous vehicle to determine its location in a geographic area that has not been previously visited or has been modified (e.g., is under construction). Furthermore, this can improve the ability of the vehicle to autonomously navigate through such unknown and/or modified geographic areas by improving the ability of the autonomous vehicle to plan its motion.

The systems and methods of the present disclosure also provide an improvement to vehicle computing technology, such as autonomous vehicle computing technology. For instance, the systems and methods enable the vehicle technology to determine its location in a more computationally efficient manner. In particular, a computing system (e.g., a vehicle computing system) can obtain sensor data indicative of one or more geographic cues within the surrounding environment of the autonomous vehicle. The computing system can also obtain sparse geographic data associated with the surrounding environment of the autonomous vehicle. The sparse geographic data can also be indicative of the one or more geographic cues. The computing system can determine a location of the autonomous vehicle within the surrounding environment based at least in part on the sensor data indicative of the one or more geographic cues and the sparse geographic data. The computing system can output data indicative of the location of the autonomous vehicle within the surrounding environment (e.g., to the vehicle's autonomy sub-systems). By determining the location of the autonomous vehicle based on the cue(s) of the sensor data and the cue(s) in the sparse geographic data, the computing system can accurately localize the autonomous vehicle within its surrounding environment while using less processing resources than is typically required for localization based on detailed and robust map data.

The present disclosure provides an improved, affordable real-time localization approach with centimeter level accuracy (e.g., 15 cm lateral accuracy). This can include the use of a deep structured network which jointly detects lanes from sensor measurements (e.g., three-dimensional sensor data) and matches them with sparse geographic data (e.g., lane graphs). The deep structured model that exploits geometric and semantic cues as well as the dynamics of the vehicle. The approach is flexible and scalable as it does not require training data for each scene that may be encountered. Indeed, the techniques of the present disclosure does not require any pre-recorded appearance knowledge of the environment in which the vehicle is to be localized.

Although the present disclosure is discussed with particular reference to autonomous vehicle localization, the systems and methods described herein are applicable for localization of other devices. For example, the techniques described herein can be implemented and utilized by other computing systems such as, for example, user devices, robotic systems, non-autonomous vehicle systems, etc. (e.g., to localize those systems within their surrounding environment). Further, although the present disclosure is discussed with particular reference to certain networks, the systems and methods described herein can also be used in conjunction with many different forms of machine-learned models in addition or alternatively to those described herein. The reference to implementations of the present disclosure with respect to an autonomous vehicle is meant to be presented by way of example and is not meant to be limiting.

With reference now to the FIGS., example embodiments of the present disclosure will be discussed in further detail.

FIG. 1 illustrates an example system 100 according to example embodiments of the present disclosure. The system 100 can include a vehicle computing system 105 associated with a vehicle 110. The system 100 can include an operations computing system 115 that is remote from the vehicle 110.

In some implementations, the vehicle 110 can be associated with an entity (e.g., a service provider, owner, manager). The entity can be one that offers one or more vehicle service(s) to a plurality of users via a fleet of vehicles that includes, for example, the vehicle 110. In some implementations, the entity can be associated with only vehicle 110 (e.g., a sole owner, manager). In some implementations, the operations computing system 115 can be associated with the entity. The vehicle 110 can be configured to provide one or more vehicle services to one or more users 120. The vehicle service(s) can include transportation services (e.g., rideshare services in which user rides in the vehicle 110 to be transported), courier services, delivery services, and/or other types of services. The vehicle service(s) can be offered to the users 120 by the entity, for example, via a software application (e.g., a mobile phone software application). The entity can utilize the operations computing system 115 to coordinate and/or manage the vehicle 110 (and its associated fleet, if any) to provide the vehicle services to a user 120.

The operations computing system 115 can include one or more computing devices that are remote from the vehicle 110 (e.g., located off-board the vehicle 110). For example, such computing device(s) can be components of a cloud-based server system and/or other type of computing system that can communicate with the vehicle computing system 105 of the vehicle 110 (and/or a user device). The computing device(s) of the operations computing system 115 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 115 (e.g., the one or more processors, etc.) to perform operations and functions, such as providing data to and/or obtaining data from the vehicle 110, for managing a fleet of vehicles (that includes the vehicle 110), etc.

The vehicle 110 incorporating the vehicle computing system 105 can be various types of vehicles. For instance, the vehicle 110 can be a ground-based autonomous vehicle such as an autonomous truck, autonomous car, autonomous bus, etc. The vehicle 110 can be an air-based autonomous vehicle (e.g., airplane, helicopter, or other aircraft) or other types of vehicles (e.g., watercraft, etc.). The vehicle 110 can be an autonomous vehicle that can drive, navigate, operate, etc. with minimal and/or no interaction from a human operator (e.g., driver). In some implementations, a human operator can be omitted from the vehicle 110 (and/or also omitted from remote control of the vehicle 110). In some implementations, a human operator can be included in the vehicle 110. In some implementations, the vehicle 110 can be a non-autonomous vehicle (e.g., ground-based, air-based, water-based, other vehicles, etc.).

In some implementations, the vehicle 110 can be configured to operate in a plurality of operating modes. The vehicle 110 can be configured to operate in a fully autonomous (e.g., self-driving) operating mode in which the vehicle 110 is controllable without user input (e.g., can drive and navigate with no input from a human operator present in the vehicle 110 and/or remote from the vehicle 110). The vehicle 110 can operate in a semi-autonomous operating mode in which the vehicle 110 can operate with some input from a human operator present in the vehicle 110 (and/or a human operator that is remote from the vehicle 110). The vehicle 110 can enter into a manual operating mode in which the vehicle 110 is fully controllable by a human operator (e.g., human driver, pilot, etc.) and can be prohibited and/or disabled (e.g., temporary, permanently, etc.) from performing autonomous navigation (e.g., autonomous driving). In some implementations, the vehicle 110 can implement vehicle operating assistance technology (e.g., collision mitigation system, power assist steering, etc.) while in the manual operating mode to help assist the human operator of the vehicle 110.

The operating modes of the vehicle 110 can be stored in a memory onboard the vehicle 110. For example, the operating modes can be defined by an operating mode data structure (e.g., rule, list, table, etc.) that indicates one or more operating parameters for the vehicle 110, while in the particular operating mode. For example, an operating mode data structure can indicate that the vehicle 110 is to autonomously plan its motion when in the fully autonomous operating mode. The vehicle computing system 105 can access the memory when implementing an operating mode.

The operating mode of the vehicle 110 can be adjusted in a variety of manners. For example, the operating mode of the vehicle 110 can be selected remotely, off-board the vehicle 110. For example, an entity associated with the vehicle 110 (e.g., a service provider) can utilize the operations computing system 115 to manage the vehicle 110 (and/or an associated fleet). The operations computing system 115 can send data to the vehicle 110 instructing the vehicle 110 to enter into, exit from, maintain, etc. an operating mode. By way of example, the operations computing system 115 can send data to the vehicle 110 instructing the vehicle 110 to enter into the fully autonomous operating mode. In some implementations, the operating mode of the vehicle 110 can be set onboard and/or near the vehicle 110. For example, the vehicle computing system 105 can automatically determine when and where the vehicle 110 is to enter, change, maintain, etc. a particular operating mode (e.g., without user input). Additionally, or alternatively, the operating mode of the vehicle 110 can be manually selected via one or more interfaces located onboard the vehicle 110 (e.g., key switch, button, etc.) and/or associated with a computing device proximate to the vehicle 110 (e.g., a tablet operated by authorized personnel located near the vehicle 110). In some implementations, the operating mode of the vehicle 110 can be adjusted by manipulating a series of interfaces in a particular order to cause the vehicle 110 to enter into a particular operating mode.

The vehicle computing system 105 can include one or more computing devices located onboard the vehicle 110. For example, the computing device(s) can be located on and/or within the vehicle 110. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 110 (e.g., its computing system, one or more processors, etc.) to perform operations and functions, such as those described herein for determining object motion, controlling vehicle motion, etc.

The vehicle 110 can include a communications system 125 configured to allow the vehicle computing system 105 (and its computing device(s)) to communicate with other computing devices. The vehicle computing system 105 can use the communications system 125 to communicate with the operations computing system 115 and/or one or more other computing devices over one or more networks (e.g., via one or more wireless signal connections). In some implementations, the communications system 125 can allow communication among one or more of the system(s) on-board the vehicle 110. The communications system 125 can include any suitable components for interfacing with one or more network(s), including, for example, transmitters, receivers, ports, controllers, antennas, and/or other suitable components that can help facilitate communication.

As shown in FIG. 1, the vehicle 110 can include one or more vehicle sensors 130, an autonomy computing system 135, one or more vehicle control systems 140, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 130 can be configured to acquire sensor data 145. This can include sensor data associated with the surrounding environment of the vehicle 110. For instance, the sensor data 145 can acquire image and/or other data within a field of view of one or more of the vehicle sensor(s) 130. The vehicle sensor(s) 130 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 145 can include image data, radar data, LIDAR data, and/or other data acquired by the vehicle sensor(s) 130. The vehicle 110 can also include other sensors configured to acquire data associated with the vehicle 110. For example, the vehicle can include inertial measurement unit(s), wheel odometry devices, and/or other sensors that can acquire data indicative of a past, present, and/or future state of the vehicle 110.

In some implementations, the sensor data 145 can be indicative of one or more objects within the surrounding environment of the vehicle 110. The object(s) can include, for example, vehicles, pedestrians, bicycles, and/or other objects. The object(s) can be located in front of, to the rear of, to the side of the vehicle 110, etc. The sensor data 145 can be indicative of locations associated with the object(s) within the surrounding environment of the vehicle 110 at one or more times. The vehicle sensor(s) 130 can provide the sensor data 145 to the autonomy computing system 135.

In addition to the sensor data 145, the autonomy computing system 135 can obtain map data 150. The map data 150 can provide information about the surrounding environment of the vehicle 110. The map data 150 can include sparse geographic data (e.g., lane graphs), as described herein. In some implementations, a vehicle 110 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 110 in comprehending and perceiving its surrounding environment and its relationship thereto. In some implementations, the vehicle computing system 105 can determine a vehicle route for the vehicle 110 based at least in part on the map data 150.

Figure 6A:
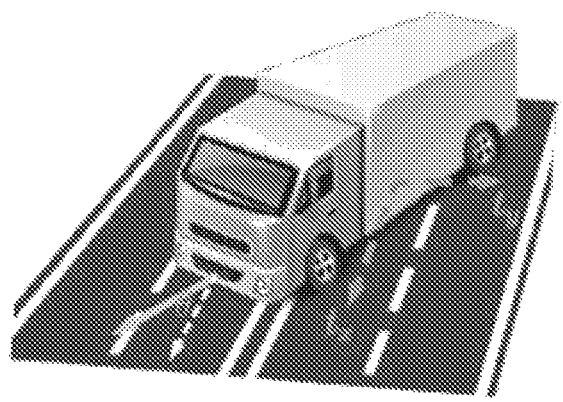
FIGS. 6A-B depicts example parameterization according to example embodiments of the present disclosure.

The vehicle 110 can include a positioning/localization system 155. The positioning/localization system 155 can determine a current position (pose) of the vehicle 110. The positioning/localization system 155 can be any device or circuitry for analyzing the position of the vehicle 110. The positioning/localization system 155 can include one or more sub-systems. For example, the positioning/localization system 155 can include a lightweight localization system configured to determine a position of the vehicle based at least in part on the lightweight vehicle localization techniques described by the present disclosure. In some implementations, the positioning/localization system 155 can include a more robust localization system that is configured to determine a position of the vehicle based at least in part on more robust, detailed map data (e.g., high definition map data). In some implementations, the positioning/localization system 155 can be configured to utilize other localization techniques (e.g., based on IP address, by using triangulation and/or proximity to network access points or other network components, etc.). The position of the vehicle 110 can be used by various systems of the vehicle computing system 105 and/or provided to a remote computing device (e.g., of the operations computing system 115). The positioning/localization system 155 can identify a position of the vehicle 110 within the surrounding environment (e.g., across six axes) based at least in part on the sensor data 145. With respect to the lightweight localization described herein, the vehicle's position can be parametrized with only three degrees of freedom consisting of a two-dimensional translation and a heading angle (e.g., as shown in FIG. 6A illustrating an example parameterization of the vehicle's pose).

The autonomy computing system 135 can include a perception system 160, a prediction system 165, a motion planning system 170, and/or other systems that cooperate to perceive the surrounding environment of the vehicle 110 and determine a motion plan for controlling the motion of the vehicle 110 accordingly. For example, the autonomy computing system 135 can obtain the sensor data 145 from the vehicle sensor(s) 130, process the sensor data 145 (and/or other data) to perceive its surrounding environment, predict the motion of objects within the surrounding environment, and generate an appropriate motion plan through such surrounding environment. The autonomy computing system 135 can communicate with (directly or indirectly) the one or more vehicle control systems 140 to operate the vehicle 110 according to the motion plan.

The vehicle computing system 105 (e.g., the autonomy system 135) can identify one or more objects that are proximate to the vehicle 110 based at least in part on the sensor data 145 and/or the map data 150. For example, the vehicle computing system 105 (e.g., the perception system 160) can process the sensor data 145, the map data 150, etc. to obtain perception data 175. The vehicle computing system 105 can generate perception data 175 that is indicative of one or more states (e.g., current and/or past state(s)) of one or more objects that are within a surrounding environment of the vehicle 110. For example, the perception data 175 for each object can describe (e.g., for a given time, time period, etc.) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 160 can provide the perception data 175 to the prediction system 165, the motion planning system 170, and/or another system.

The prediction system 165 can be configured to predict a motion of the object(s) within the surrounding environment of the vehicle 110. For instance, the prediction system 165 can generate prediction data 180 associated with such object(s). The prediction data 180 can be indicative of one or more predicted future locations of each respective object. For example, the prediction system 180 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 180 can be indicative of the speed and/or acceleration at which the respective object is predicted to travel along its associated predicted motion trajectory. The prediction system 165 can output the prediction data 180 (e.g., indicative of one or more of the predicted motion trajectories) to the motion planning system 170.

The vehicle computing system 105 (e.g., the motion planning system 170) can determine a motion plan 185 for the vehicle 110 based at least in part on the perception data 175, the prediction data 180, and/or other data. A motion plan 185 can include vehicle actions (e.g., planned vehicle trajectories, speed(s), acceleration(s), other actions, etc.). The vehicle actions can be formulated with respect to one or more of the objects within the surrounding environment of the vehicle 110 as well as the objects' predicted movements, if any. For instance, the motion planning system 170 can implement an optimization algorithm, model, etc. that considers cost data associated with a vehicle action as well as other objective functions (e.g., cost functions based on speed limits, traffic lights, etc.), if any, to determine optimized variables that make up the motion plan 185. The motion planning system 170 can determine that the vehicle 110 can perform a certain action (e.g., pass an object) without increasing the potential risk to the vehicle 110 and/or violating any traffic laws (e.g., speed limits, lane boundaries, signage, etc.). For instance, the motion planning system 170 can evaluate one or more of the predicted motion trajectories of one or more objects during its cost data analysis as it determines an optimized vehicle trajectory through the surrounding environment. The motion planning system 185 can generate cost data associated with such trajectories. In some implementations, one or more of the predicted motion trajectories may not ultimately change the motion of the vehicle 110 (e.g., due to an overriding factor such as a jaywalking pedestrian). In some implementations, the motion plan 185 may define the vehicle's motion such that the vehicle 110 avoids the object(s), reduces speed to give more leeway to one or more of the object(s), proceeds cautiously, performs a stopping action, etc.

The motion planning system 170 can be configured to continuously update the vehicle's motion plan 185 and a corresponding planned vehicle motion trajectory. For example, in some implementations, the motion planning system 170 can generate new motion plan(s) 185 for the vehicle 110 (e.g., multiple times per second). Each new motion plan can describe a motion of the vehicle 110 over the next planning period (e.g., next several seconds). Moreover, a new motion plan may include a new planned vehicle motion trajectory. Thus, in some implementations, the motion planning system 170 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 110.

The vehicle computing system 105 can cause the vehicle 110 to initiate a motion control in accordance with at least a portion of the motion plan 185. For instance, the motion plan 185 can be provided to the vehicle control system(s) 140 of the vehicle 110. The vehicle control system(s) 140 can be associated with a vehicle controller (e.g., including a vehicle interface) that is configured to implement the motion plan 185. The vehicle controller can, for example, translate the motion plan into instructions for the appropriate vehicle control component (e.g., acceleration control, brake control, steering control, etc.). By way of example, the vehicle controller can translate a determined motion plan 185 into instructions to adjust the steering of the vehicle 110 a certain number of degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 185 (e.g., by sending control signal(s), making the translated plan available, etc.). This can allow the vehicle 110 to autonomously travel within the vehicle's surrounding environment.

Figure 2:
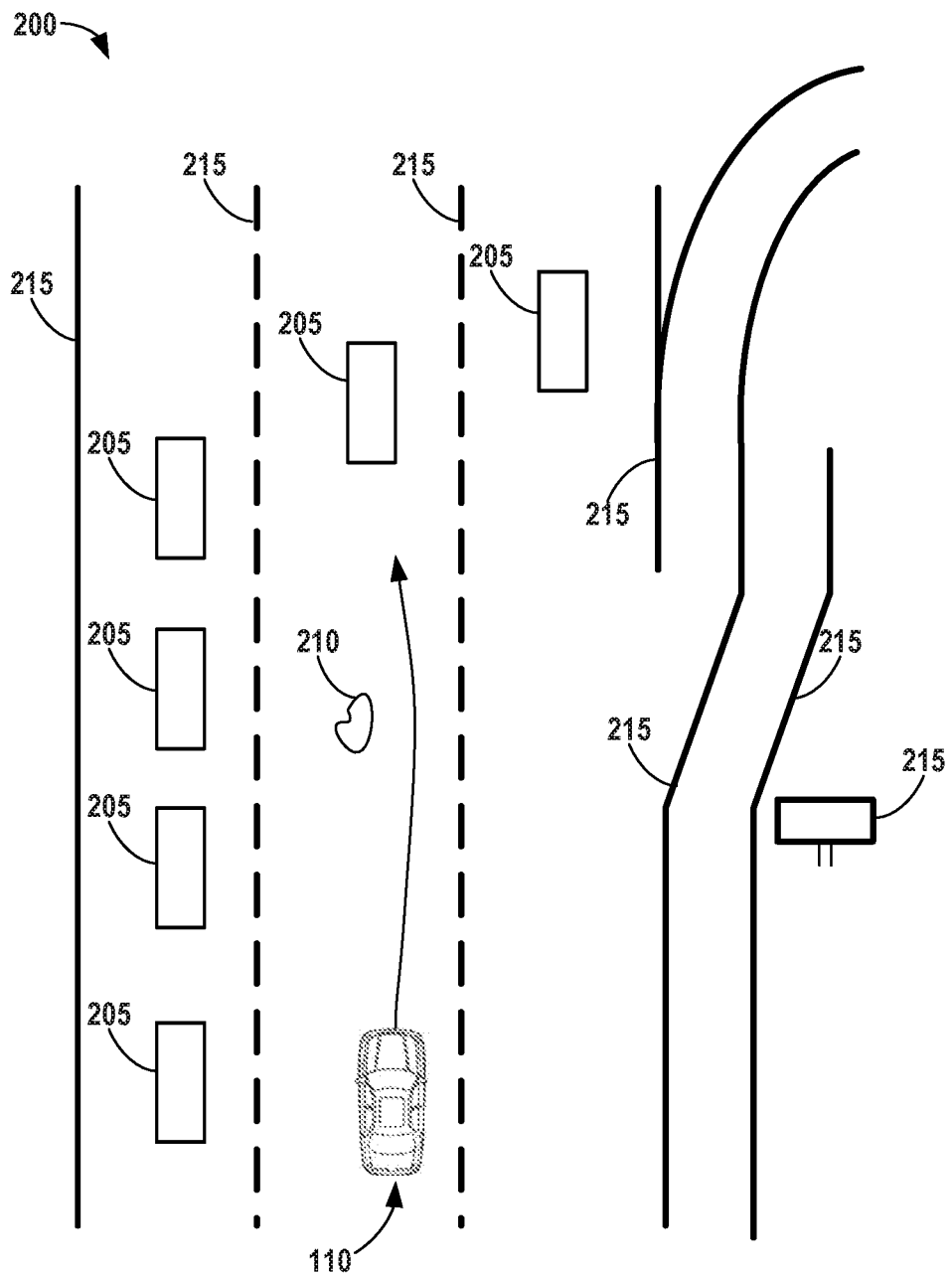
FIG. 2 depicts an example environment according to example embodiments of the present disclosure.

FIG. 2 depicts an example environment 200 of the vehicle 110 according to example embodiments of the present disclosure. The surrounding environment 200 of the vehicle 110 can be, for example, a highway environment, an urban environment, a residential environment, a rural environment, and/or other types of environments. The surrounding environment 200 can include one or more objects 205 (e.g., another vehicle, etc.), obstruction(s) 210, and/or other elements. The surrounding environment 200 can include one or more geographic cues 215. The geographic cue(s) 215 can include various features within the surrounding environment 200 of the vehicle 110. For instance, the geographic cue(s) 215 can include one or more lane boundaries (e.g., markings or other indicia a travel lane, travel way, etc. and/or the boundaries thereof), one or more traffic signs, one or more travel way curves (e.g., exit ramps, etc.), one or more barriers (e.g., curbs, retaining walls, guard rails, etc.), one or more bridges, and/or one or more other types of features. The vehicle 110 can be configured to detect these geographic cue(s) 215 and match them to sparse geographic data indicative of the same in order to quickly determine the location of the vehicle 110 within its surrounding environment 200.

Figure 3:
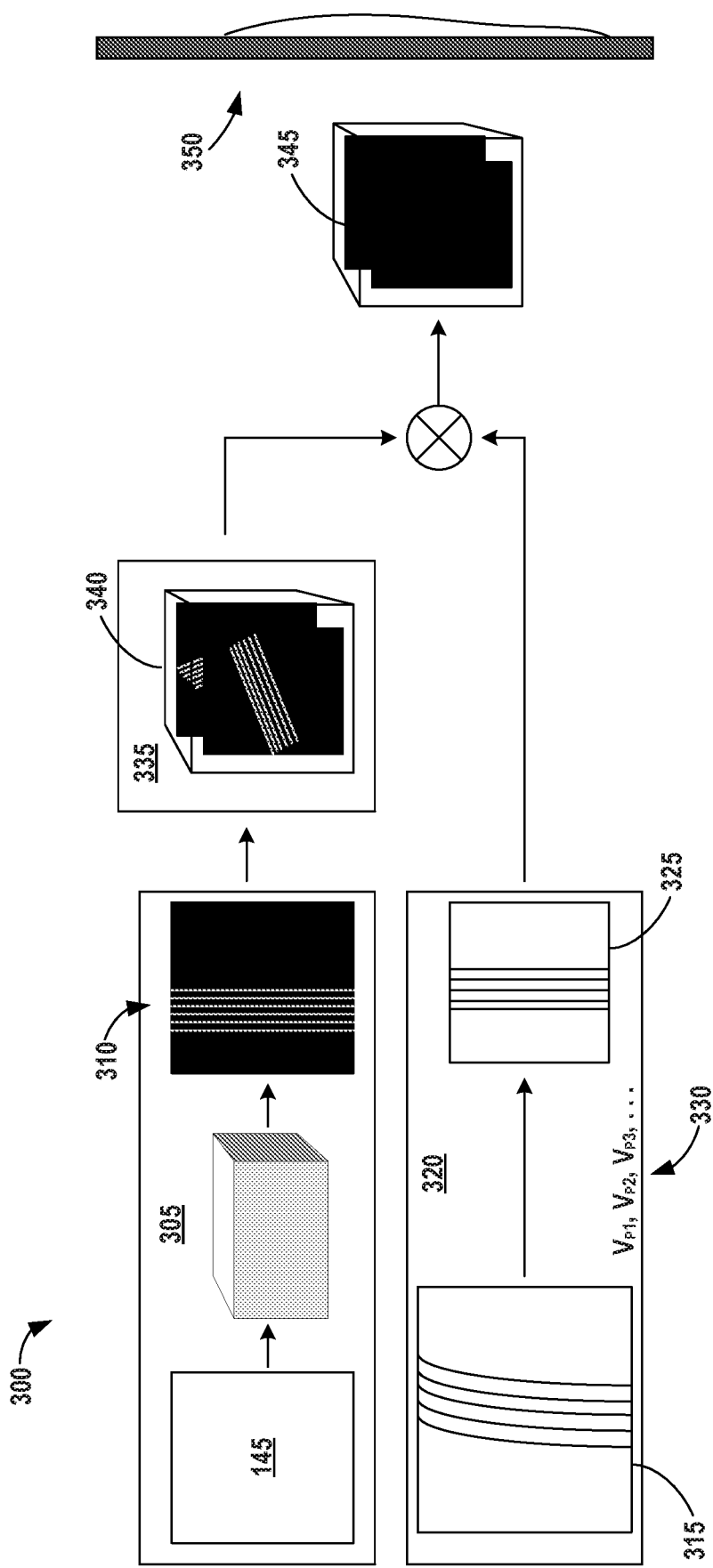
FIG. 3 depicts an example processing pipeline according to example embodiments of the present disclosure.

FIG. 3 depicts an example processing pipeline 300 according to example embodiments of the present disclosure. The processing pipeline 300 can be performed by the vehicle computing system 100 (and/or another computing system). In some implementations, the localization approach provided by processing pipeline 300 can be performed without the use of machine-learned models. In some implementation, such localization can be performed with the use of one or more machine-learned models, as further described herein with reference to FIG. 4.

As shown in FIG. 3, to help localize the vehicle 110, the vehicle computing system 105 (e.g., the lightweight localization system) can obtain (e.g., via the one or more sensors 130) sensor data 145 indicative of one or more geographic cues within the surrounding environment of the autonomous vehicle. For example, the vehicle computing system 105 can obtain sensor data 145 indicative of one or more lane boundaries within the surrounding environment 200 of the vehicle 110. As described herein, the one or more sensors 130 of the vehicle 110 can include a LIDAR system and/or one or more cameras. The sensor data 145 can include, for example, LIDAR data acquired via the LIDAR system of the vehicle 110 and/or image data acquired via the one or more cameras of the vehicle 110.

The vehicle computing system 105 (e.g., a segmentation module 305) can identify the one or more geographic cues 310 within the surrounding environment of the vehicle 110 based at least in part on the sensor data 145. The detected geographic cue(s) 310 can be one or more of the geographic cue(s) 215 the environment 200 of FIG. 2. For example, the vehicle computing system 105 can process the sensor data 145 (e.g., the LIDAR data) to analyze which portions of the sensor data 145 (e.g., the LIDAR point cloud) correspond to one or more lane boundaries within the surrounding environment 200 of the vehicle 110. In some implementation, the computing system 105 can identify the geographic cue(s) 310 based at least in part on heuristics developed to allow the computing system 105 to predict which portions of the sensor data 145 are likely to be indicative of the geographic cue(s) 310. In some implementations, the vehicle computing system 105 can identify the geographic cue(s) 310 based at least in part on one or more machine-learned model(s), as further described herein.

The vehicle computing system 105 can obtain sparse geographic data 315 associated with the surrounding environment of the vehicle 110. Such data can be sparse in that it omits several features that would be included in a more robust set of map data for an environment in which the vehicle 110 is travelling. For instance, the sparse geographic data 315 can be indicative of the one or more geographic cues that the computing system 105 (e.g., the lightweight localization system) can use to determine the vehicle's location, while omitting the other features of the surrounding environment. By way of example, the sparse geographic data 315 can include a lane graph associated with the surrounding environment 200 of the vehicle 110. A lane graph can represent a portion of the surrounding environment 200 of the vehicle 110 such as a travel way (e.g., a road, street, etc.). The lane graph can be indicative of one or more lane boundaries. For example, the lane graph can include polyline(s) that estimate the position of the lane boundaries on the travel way. As used herein, a polyline can be a representation of a lane boundary. A polyline can include a line (e.g., continuous line, broken line, etc.) that includes one or more segments. A polyline can include a plurality of points such as, for example, a sequence of vertices. In some implementations, the vertices can be connected by the one or more segments. In some implementations, the sequence of vertices may not be connected by the one or more segments.

The vehicle computing system 100 can obtain the sparse geographic data 315 in a variety of manners. In some implementations, the sparse geographic data 315 (e.g., the lane graph) can be generated by the vehicle 110 in at least near real-time (e.g., accounting for any processing and/or transmission delays, etc.) as the vehicle 110 is travelling. For example, a lane graph can be generated based on LIDAR lane detection techniques and/or two-dimensional optical lane detection data applied to a machine-learned model (e.g., a recurrent net) to draw out the points and/or polylines indicative of the lane boundaries. In some implementations, the vehicle computing system 105 can obtain sparse geographic data 315 that is generated by another computing system. For example, the vehicle computing system 105 can obtain sparse geographic data 315 that was generated by another computing system and is stored in a local memory onboard the vehicle 110. Additionally, or alternatively, the vehicle computing system 105 can obtain sparse geographic data 315 that includes the one or more geographic cues and no other features (or a limited number of additional features) of the environment in which the vehicle 110 is travelling from a remote computing system (e.g., the operations computing system 115) via one or more networks (e.g., wireless networks).

The vehicle computing system 105 (e.g., a first dynamics module 320) can generate transformed sparse geographic data 325 (e.g., transformed lane graph data) based at least in part on the sparse geographic data 315 (e.g., the lane graph). For instance, the vehicle computing system 105 can crop the sparse geographic data 315 into a sub-portion that corresponds to the portion of the environment in which the vehicle 110 is located. The vehicle computing system 105 can obtain data indicative of one or more vehicle parameters 330 associated with the vehicle 110. The vehicle parameter(s) 330 can include dynamic parameters of the vehicle 110 such as, for example, the vehicle's speed/velocity, acceleration, heading, etc. The vehicle computing system 105 can determine a predicted location of the vehicle 110 within the surrounding environment 200 based at least in part on the one or more vehicle parameters 330. For example, the vehicle computing system 105 can identify the vehicle's speed, heading, acceleration, etc. at a first time and interpolate where the vehicle 110 will be at a future point in time based on such vehicle parameter(s) 330. The vehicle computing system 105 can identify a sub-portion of the sparse geographic data 315 based at least in part on the predicted location of the vehicle 110 within the surrounding environment 200. The vehicle computing system 105 can crop the sparse geographic data 315 (e.g., 200×200 meter lane graph) into the sub-portion (e.g., a 1.5×1.5 meter sub-lane graph) that corresponds to the predicted location of the vehicle 110. This can allow the vehicle computing system 105 to focus its localization analysis on a sub-set of the sparse geographic data 315. Accordingly, the vehicle computing system 105 can save computational resources, while increasing the accuracy of the determined vehicle location.

The vehicle computing system 105 can transform the sensor data 145 in order to better match it to the sparse geographic data 315. For instance, the vehicle computing system 105 (e.g., a second dynamics module 335) can generate transformed sensor data 340 based at least in part on the sensor data 145 indicative of the one or more geographic cues 310. The vehicle computing system 105 can warp, rotate, translate, and/or otherwise transform the sensor data 145 indicative of the geographic cue(s) 310 to orient the detected geographic cue(s) 310 in the sensor data 145 (e.g., the lane boundaries) in a manner that allows for better matching with the geographic cue(s) of the sparse geographic data 315 (e.g., the lane boundaries in the lane graph). The vehicle computing system 105 can crop/segment the sensor data 145 to reduce the portion of the sensor data 145 and/or reduce the feature(s) indicated in the sensor data 145 for a more focused analysis. In some implementations, the sensor data transformation can be done in an iterative manner to find the orientation (e.g., rotation and/or translation) that is most comparable to that of the sparse geographic data 315.

The vehicle computing system 105 can determine a location of the vehicle 110 within the surrounding environment based at least in part on the sensor data 145 indicative of the geographic cue(s) 310 and the sparse geographic data 315 (e.g., the lane graph). The vehicle computing system 105 can compare the transformed sensor data 340 to the sparse geographic data 315 (e.g., the lane graph). For instance, the computing system 105 can compare the transformed sensor data 340 to the transformed sparse geographic data 325 (e.g., the transformed lane graph) such as, for example, the cropped sub-portion of the sparse geographic data 315 (e.g., the cropped lane graph). By way of example, the vehicle computing system 105 can warp the sensor data 145 indicative of the detected geographic cue(s) 310 (e.g., the detected lane boundaries) into a format that is similar to the geographic cue(s) depicted in the sparse geographic data 315 (e.g., the polylines of a lane graph). At a first iteration, the warped sensor data can be rotated one degree clockwise. At a second iteration, the warped sensor data can be rotated two degrees clockwise, and so forth. For each iteration, the vehicle computing system 105 can compare the transformed sensor data 340 to a sub-portion of sparse geographic data 315 (e.g., the lane graph) that corresponds to a predicted location of the vehicle 110. In doing so, the vehicle computing system 105 can utilize the sparse geographic data 315 (e.g., the sub-portion of the lane graph) as a filter and/or cross-correlation with the transformed sensor data 340. In some implementations, the vehicle computing system 105 can utilize a fixed weight convolution technique to analyze the transformed sensor data 340 relative to the sparse geographic data 315. The vehicle computing system 105 can determine the location of the vehicle 110 within the surrounding environment based at least in part on the comparison of the transformed sensor data 340 to the sparse geographic data 315 (e.g., the lane graph). For example, the vehicle computing system 105 can continue the iterative process until it determines that the transformed sensor data 340 matches (e.g., beyond a confidence threshold) the transformed geographic data 325 (e.g., the sub-portion of the lane graph).

Figure 4:
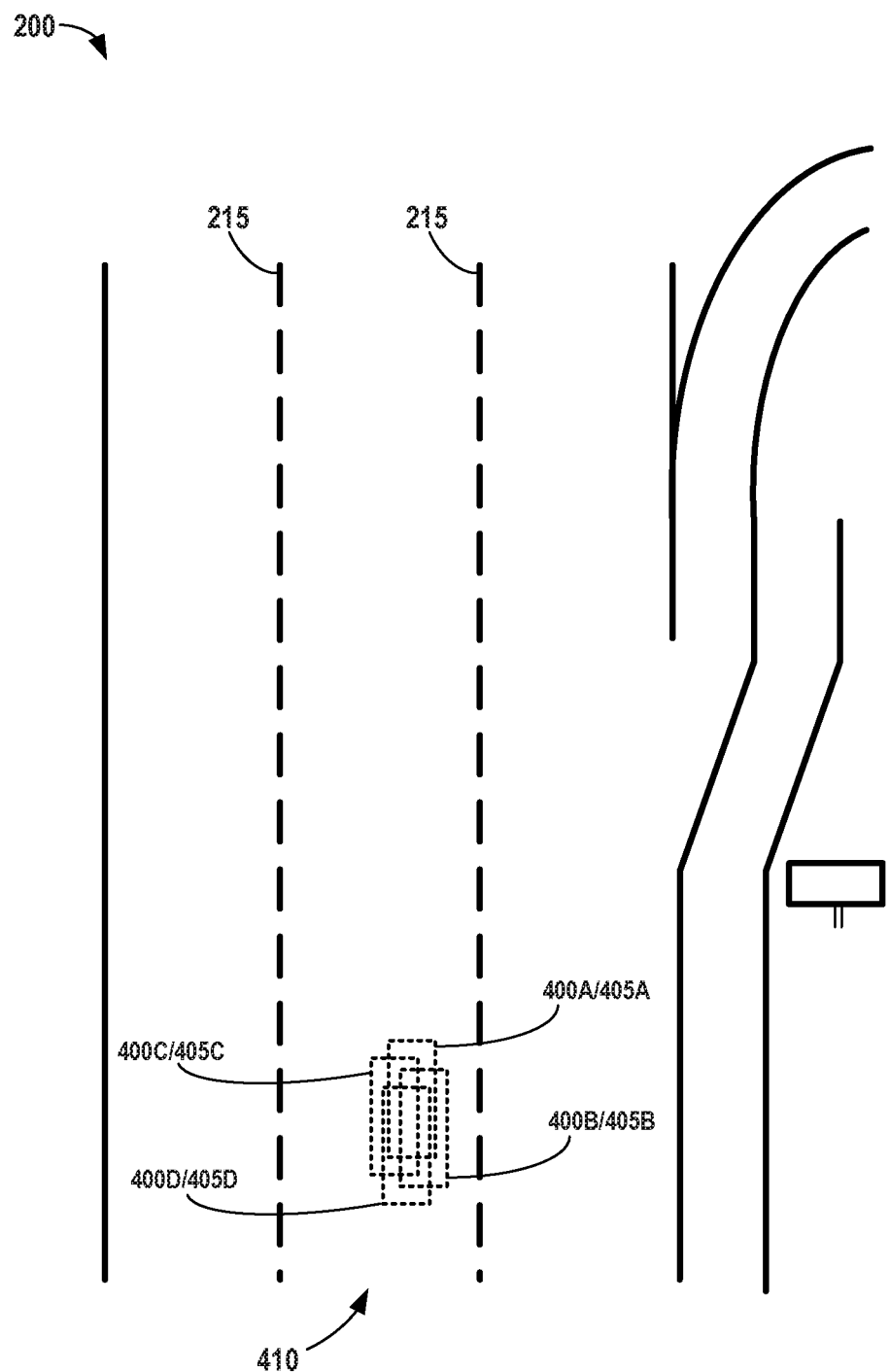
FIG. 4 depicts example predicted candidate locations according to example embodiments of the present disclosure.

To help localize the vehicle 110 within its surrounding environment 200, the vehicle computing system 105 can determine a plurality of candidate locations within the environment 200 (e.g., within a travel lane). The vehicle computing system 105 can select the location of the vehicle 110 (e.g., within the travel lane) from the plurality of candidate locations. For example, as shown in FIG. 4, the vehicle computing system 105 can determine a plurality of probabilities 400A-D for a plurality of candidate locations 405A-D of the vehicle 110 within the surrounding environment 200 based on this comparison. For example, the vehicle computing system 105 can generate data 345 (shown in FIG. 3) that indicates the respective probability score that the vehicle 110 is located at each candidate location of the plurality of different locations 405A-D (e.g., a heat map, score map, etc.). The vehicle computing system 105 can determine the location of the vehicle 110 by selecting the location from the plurality of candidate locations 405A-B based on the plurality of probabilities 400A-D. For example, the vehicle computing system 105 can select the location with the highest probability, determine an average sum of the probabilities at two or more of the candidate locations, and/or employ other statistical analysis techniques to determine the location of the vehicle 110. This can allow the vehicle computing system 105 to accurately determine the location of the vehicle 105 within, for example, a travel lane 410 of a travel way via which the vehicle 110 is traveling.

As described herein, in some implementations, the vehicle computing system 105 can include, employ, and/or otherwise leverage one or more machine-learned models to help determine the location of the vehicle 110 within its surrounding environment. The machine-learned model(s) can be or can otherwise include various model(s) such as, for example, neural networks (e.g., deep neural networks), or other multi-layer non-linear models. Neural networks can include for example, convolutional neural networks, and/or other forms of neural networks. Training techniques can be performed (e.g., backwards propagation) to train the model(s) to transform sensor data and/or sparse geographic data to be matched in order to localize the vehicle 110.

Figure 5:
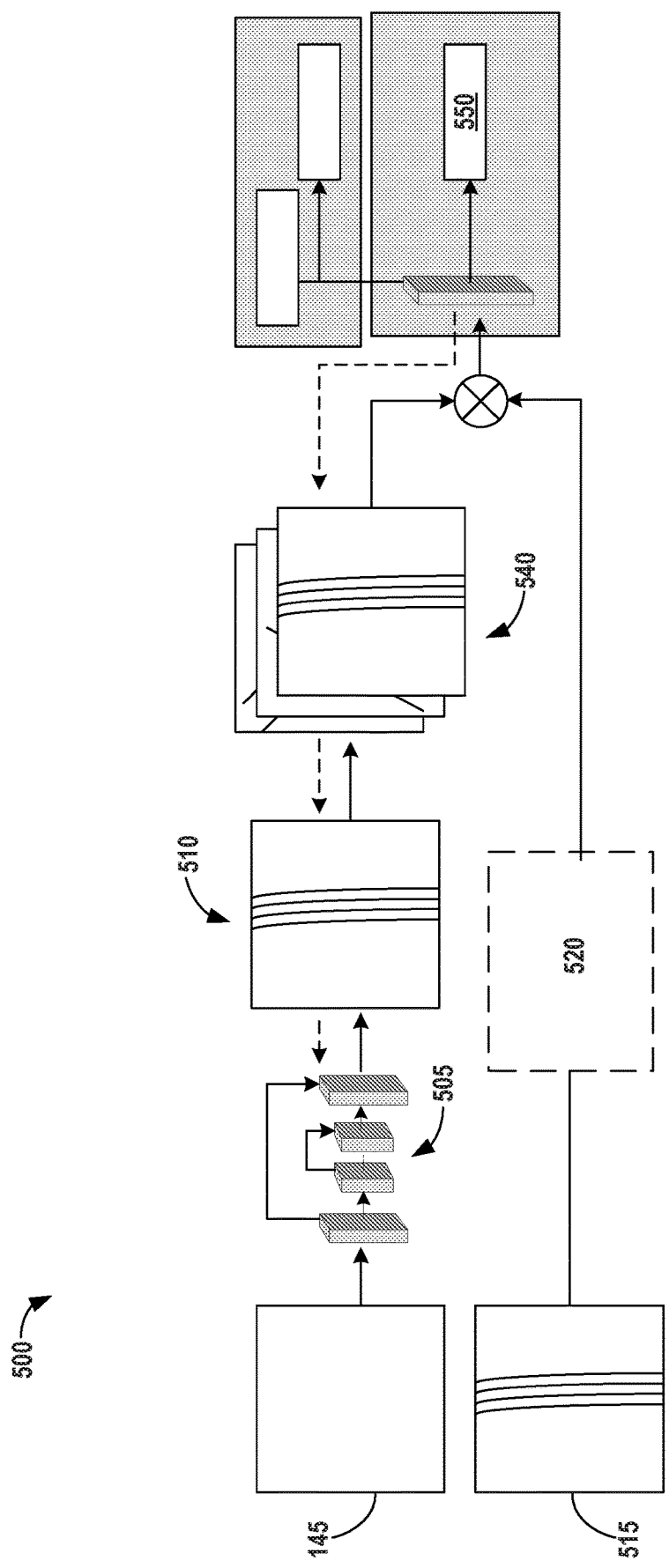
FIG. 5 depicts an example model architecture according to example embodiments of the present disclosure.

FIG. 5 depicts an example model architecture 500 according to example embodiments of the present disclosure. The vehicle computing system 105 can implement the model architecture 500 and utilize the one or more machine-learned models 505, 520 to help localize the vehicle 110 within its surrounding environment. For example, a first machine-learned model 505 can be a first convolution neural network that is configured to receive the sensor data 145 as an input and detect one or more geographic cues 510 within the environment of the vehicle 110. The sensor data 145 can be overhead LIDAR data as further described herein. The first machine-learned model 505 can be trained to transform the sensor data 145 as described herein (e.g., warp, rotate, translate, etc.) and output the transformed sensor data 540 (e.g., at several iterations).

In some implementations, the model architecture 500 can include a second machine-learned model 520. The second machine-learned model 520 can be a second convolutional neural network that is configured to receive sparse geographic data 515 (e.g., the lane graph) as an input, transform the sparse geographic data (as described herein) in manner that is better oriented with respect the transformed sensor data 540, and output the transformed sparse geographic data (e.g., at several iterations). The vehicle computing system 105 can compare the transformed sensor data 540 and the sparse geographic data 515 (e.g., the transformed sparse geographic data) to determine the location of the vehicle 110 within the surrounding environment. This can be performed using an energy function that helps to correlate the detected geographic cues 510 and the geographic cues of the sparse geographic data 515.

At each timestep t, the one or more model(s) can take a previously predicted location $x^{(t-1)}$ of the vehicle 110, the dynamics of the vehicle $y^{(t)}$, a new measurement coming from a sensor (e.g., a roof-mounted LiDAR sensor $\mathcal{I}$ ), and the sparse geographic data M (e.g., a lane graph) as the input. The vehicle's pose can be parametrized with only three degrees of freedom consisting of a two-dimensional translation and a heading angle (e.g., $x=\{t, \theta\}$, where $t \in \mathbb{R}^2$ and $\theta \in (-\pi, \pi]$). As described herein, FIG. 6A depicts a diagram 600 illustrating an example parameterization of the vehicle's pose.

The localization process can be represented as an energy minimization problem that maximizes the agreement between the detected geographic cues 510 and the geographic cues of the sparse geographic data 515 (e.g., the lane boundaries mapped to the lane graph), while taking into account the vehicle dynamics. This can be shown, for example, in the following:

$$x^{(t)} = \arg\min_{x} E_{match}(x, \mathcal{I}, \mathcal{M}; w) + E_{dyn}(x, x^{(t-1)}, y^{(t)})$$

where w represents a learnable set of parameters. By recursively solving this equation, the vehicle 110 can be localized at every timestep t.

The matching energy ($E_{match}$) can be defined to encode semantic information about the environment. For example, the first machine-learned model 505 (e.g., a first convolutional neural network for lane detection) can detect the geographic cues 510 (e.g., lane boundaries) within an environment. The matching energy ($E_{match}$) can then be computed by a matching score function that utilizes the sparse geographic data 515 and compares it to the detected geographic cues 510, as further described herein.

In order to correlate the sensor data 145 and the sparse geographic data 515, the sensor data 145 (e.g., LIDAR data) can be orthographically projected to an overhead view along the vehicle's vertical coordinate. The sparse geographic data 515 (e.g., the lane graph) can be projected along a local ground-plane's vertical direction. A similar resolution can be utilized for both of the overhead view images (e.g., 5 cm/pixel resolution, etc.).

In some implementations, the first machine-learned model 505 can be or otherwise include an object segmentation neural network. For example, the first machine-learned model 505 can include an encoder-decoder network with skip-connections between the encoder and decoder, which also aggregate information. One example existing object segmentation neural network is LinkNet (see A. Chaurasia and E. Culurciello. Linknet: Exploiting encoder representations for efficient semantic segmentation. arXiv preprint arXiv:1707.03718, 2017). This neural network can be modified to replace all deconvolutions with bilinear upsampling+convolutions to reduce potential checkerboard artifacts in the output prediction.

Figure 6B:
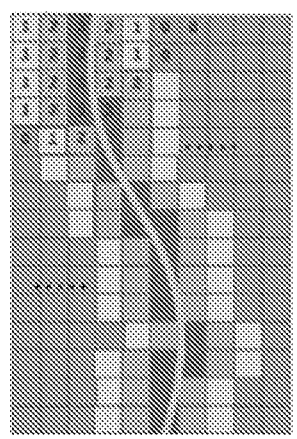

The first machine-learned model 505 can receive the overhead view of the sensor data 145 (e.g., bird's eye view image of raw three-dimensional sensor data). The first machine-learned model 505 can be configured to output an inverse truncated distance function to the sparse geographic data 515 (e.g., the transformed geographic data). This can represent the distance from each pixel to the closest point on the sparse geographic data 515 (and/or the transformed sparse geographic data, if generated). The distance can be thresholded (e.g., above 1.5 m) and its inverse can be computed (e.g., max(τ−dt(x), 0). This can be efficiently computed using a distance transform, and can have a highest score at the true location of the geographic cue 510 (e.g., the lane), as shown for example in the diagram 650 of FIG. 6B. This approach (over traditional per point discrete label representation) can help avoid significant class imbalance.

Given a proposed vehicle pose x, the detected geographic cues 510 can be transformed (e.g., rotated, translated, etc.) according to x, and a matching score can be computed with the sparse geographic data 515 (and/or the transformed sparse geographic data, if generated). By way of example, the matching score can be an inner product between the detected lane boundaries and the lane graph (and/or the transformed lane graph, if generated). The matching energy can be defined as the following inner product:

$$E_{match} = \langle \pi(f(\mathcal{I}; w_f), x), \mathcal{M} \rangle$$

where $f(\mathcal{I}; w_f)$ is the first machine-learned model 505 (e.g., the lane detection network) with $w_f$ its network parameters, and $\pi(\cdot, x)$ is the rigid transform given a proposed vehicle pose x.

The dynamics energy ($E_{dyn}$) can encode the consistency between the proposed vehicle pose x and the vehicle dynamics estimation. For example, the proposed vehicle pose can be penalized for being further away from the composition between the previous pose estimation $x^{(t-1)}$ and a pose increment from the vehicle dynamics $y^{(t)}$:

$$E_{dyn} = \tau_B(x \ominus (x^{(t-1)} \oplus y^{(t)}))$$

where $\oplus$ and $\ominus$ are pose composition operator and inverse pose composition operator respectively which are defined as $$a \oplus b = \begin{bmatrix} x_a + x_b \cdot \cos\theta_a - y_b \cdot \sin\theta_a \\ y_a + x_b \cdot \sin\theta_a + y_b \cdot \cos\theta_a \\ \theta_a + \theta_b \end{bmatrix}$$

$$a \ominus b = \begin{bmatrix} (x_a - x_b) \cdot \cos\theta_b + (x_b - y_b) \cdot \sin\theta_b \\ -(x_a - x_b) \cdot \sin\theta_b + (x_b - y_b) \cdot \cos\theta_b \\ \theta_a + \theta_b \end{bmatrix}$$

$\tau_B$ can be defined as an indicator function given a known set B: $\mathcal{T}=0$ if $z \in B$; $\mathcal{T}=\infty$ otherwise, where the set B is introduced to constrain the proposed pose within a search range centered at $(x^{(t-1)} \oplus y^{(t)})$. For model development, a search range can be chosen in which the ground truth pose is guaranteed to lie (e.g., B=[−0:75 m, +0.75 m]×[−0:75 m, +0.75 m]×[2°, 2°]).

As described herein, the model architecture 500 can allow for the determination of the vehicle's location within the environment (e.g., an inference of the vehicle's pose). For example, the search space can be discretized with a particular stepsize (e.g., of 5 cm, etc.) for location and a particular heading angle (e.g., 1 degree, etc.). The center of the search range can be based on the vehicle dynamics (e.g., computed from IMU sensors, etc.). As similarly described herein, determination of the vehicle's location can involve enumerating all the possible locations and pose angles to compute the inner-product between the detected geographic cues 510 (e.g., lane boundaries) and the sparse geographic data 315 (e.g., lane graph) and/or the transformed sparse geographic data, if generated. Note that for a fix angle, computing the energy at all the two-dimensional locations can be performed efficiently with a standard convolution filter. Thus, the model architecture of FIG. 5 can implement the dot-product scoring function over all positions with a single convolution operator per angle θ, where the input image is M and the convolution kernel is $\pi(f(\mathcal{I}; w_f), \theta)$. This can allow the one or more models to run once, and conduct |Θ| times convolution to get the $E_{match}$ scores, where |Θ| is the number of pose angles that are searched over (as implemented by the end-to-end architecture of FIG. 5). In some implementations, block FFT convolutions can be utilized to accelerate the matching by two orders of magnitude compared against a standard convolution (e.g., due to a large kernel size and the small output structure of the convolutions). According, the energy minimization could be easily and efficiently achieved. For example, the full inference portion can take 41 milliseconds per frame.

As shown in FIGS. 3 and 5, the vehicle computing system can output data 350, 550 indicative of the location of the vehicle 110 within the surrounding environment. This can include, for example, the location of the vehicle 110 within a travel lane of a travel way via which the vehicle 110 is traveling. For instance, the positioning/localization system 155 of the vehicle computing system 105 (e.g., the light-weight localization system) can provide data 350, 550 indicative of the location of the vehicle 110 to one or more of the other systems of the vehicle 110. For example, the data 350, 550 indicative of the location of the vehicle 110 can be provided (e.g., sent to, transmitted to, transferred to, communicated to, made available to, etc.) the various sub-systems of the vehicle's autonomy system 135 (e.g., the perception system 160, the prediction system 165, the motion planning system, etc.) and/or other systems.

The vehicle computing system 105 can determine one or more vehicle actions to be performed by the vehicle 110 based at least in part on the location of the vehicle 110. For instance, the vehicle computing system 105 (e.g., the perception system 160) can determine perception data 175 associated with an object based at least in part on the determined location of the vehicle 110. By way of example, the vehicle computing system 105 (e.g., the perception system 160) can utilized the location inference to determine information about a past and/or current state of an object such as, for example, the object's position and/or distance with respect to the vehicle 110. Additionally, or alternatively, the vehicle computing system 105 (e.g., the prediction system 165) can determine prediction data 180 associated with an object based at least in part on the determined location of the vehicle 110. By way of example, the vehicle computing system 105 (e.g., the prediction system 165) can utilized the determined location to determine a predicted trajectory of the object with respect to the vehicle 110 (e.g., within the vehicle's travel lane). Additionally, or alternatively, the vehicle computing system 105 (e.g., the motion planning system 170) can determine a motion plan 185 for the vehicle 110 based at least in part on the location of the vehicle 110 within the surrounding environment. For example, the vehicle computing system 105 can determine whether the vehicle 110 needs to nudge left or right within its travel lane to avoid an obstruction (e.g., obstruction 210 shown in FIG. 2) based on the determined location of the vehicle 110 within a travel lane. The vehicle computing system 105 can cause the vehicle 110 to initiate a motion control in accordance with at least a portion of the motion plan 185. For example, the vehicle computing system 105 (e.g., a vehicle controller) can cause the vehicle 110 to initiate travel in accordance with at least a portion of the motion plan 185, to avoid the obstruction 210. In some implementations, the vehicle computing system 105 can provide the data 350, 550 indicative of the location of the vehicle 110 to a remote computing system (e.g., the operations computing system 115). This can allow such a remote computing system to identify and/or track the location of the vehicle 110.

Although the present disclosure is discussed with particular reference to autonomous vehicles, the systems and methods described herein are applicable to the use of machine-learned models for other purposes. For example, the techniques described herein can be implemented and utilized by other computing systems such as, for example, user devices, robotic systems, non-autonomous vehicle systems, etc. (e.g., to localize itself within its environment). Further, although the present disclosure is discussed with particular reference to certain networks, the systems and methods described herein can also be used in conjunction with many different forms of machine-learned models in addition or alternatively to those described herein.

Figure 7:
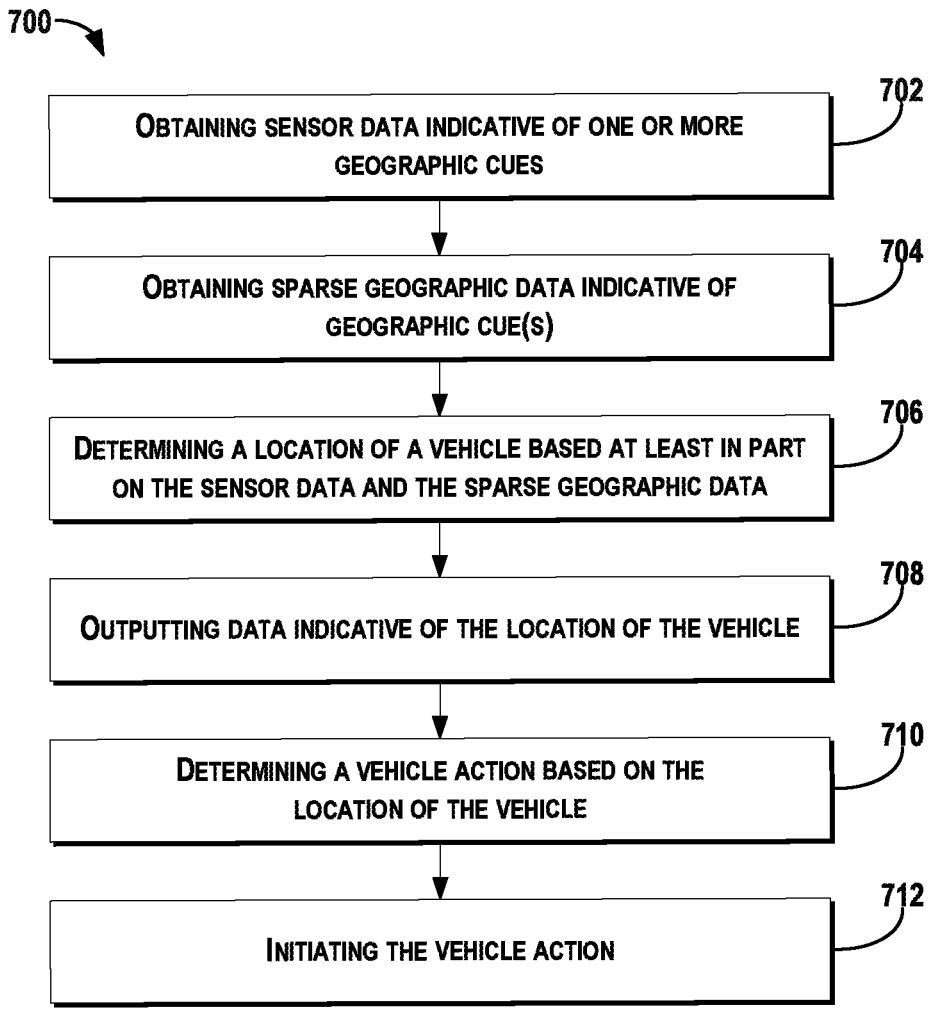
FIG. 7 depicts a flow diagram of a method for autonomous vehicle localization according to example embodiments of the present disclosure.

FIG. 7 depicts a flow diagram of an example method 700 for vehicle (and/or other computing system) localization according to example embodiments of the present disclosure. One or more portion(s) of the method 700 can be implemented by a computing system that includes one or more computing devices such as, for example, the computing systems described herein (e.g., with reference to FIGS. 1 and 8) and/or other computing systems (e.g., user devices, robots, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1 and 8) and/or other computing systems, for example, to localize a vehicle and/or another computing system. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to other systems and figures for example illustrated purposes and is not meant to be limiting. One or more portions of method 700 can be performed additionally, or alternatively, by other systems.

At (702), the method 700 can include obtaining sensor data indicative of one or more geographic cues. For instance, the vehicle computing system 105 (onboard the vehicle 110) can obtain sensor data 145 indicative of one or more geographic cues within the surrounding environment of the vehicle 110. As described herein, the sensor data 145 can include at least one of LIDAR data or image data. The sensor data 145 can be acquired from and/or projected to an overhead view. The one or more geographic cues can include at least one of one or more lane boundaries, one or more traffic signs, one or more travel way curves, one or more barriers, or one or more bridges. In some implementations, other types of geographic cues can be utilized. In some implementations, the geographic cues can be included in the surrounding environment of a computing system such as, for example, a user device, robot, etc. The computing system can be configured to obtain sensor data as similarly described herein.

At (704), the method 700 can include obtaining sparse geographic data indicative of one or more geographic cues. The vehicle computing system 105 can obtain sparse geographic data associated with the surrounding environment (e.g., of the vehicle 110, other computing system(s), etc.). The sparse geographic data can be indicative of the one or more geographic cues (e.g., lane boundaries, other markings). As described herein, the sparse geographic data can omit all other features associated with the surrounding environment (e.g., of the vehicle 110, other computing system(s), etc.) that are not the one or more geographic cues. For instance, the sparse geographic data may only be indicative of the one or more geographic cues (utilized for the localization process). By way of example, the one or more geographic cues can include one or more lane boundaries within the surrounding environment of the vehicle 110. The sparse geographic data can be indicative of a lane graph associated with the surrounding environment of the vehicle 110. The lane graph can be indicative of the one or more lane boundaries.

The vehicle computing system 105 can obtain the sparse geographic data in a variety of manners. For instance, the sparse geographic data can be generated by the vehicle 110 and/or other computing system in at least near real-time (e.g., as the vehicle 110 is travelling). Additionally, or alternatively, the vehicle 110 and/or computing system can obtain previously generated sparse geographic data from a local memory and/or a system that is remote from the vehicle 110 and/or computing system.

As described herein, the vehicle computing system 105 can crop the sparse geographic data to focus the localization analysis. For example, the vehicle computing system 105 can obtain data indicative of one or more vehicle parameters associated with the vehicle 110. The vehicle computing system 105 can determine a predicted location of the vehicle 110 within the surrounding environment based at least in part on the one or more vehicle parameters, as described herein. The vehicle computing system 105 identify a sub-portion of the sparse geographic data based at least in part on the predicted location of the vehicle 110 within the surrounding environment. In some implementations, a computing system other than a vehicle computing system (e.g., a user device, etc.) can obtain parameters associated with the computing system, determine a predicted location of the computing system, and identify a sub-portion of the sparse geographic data. In this way, the computing system can crop the sparse geographic data.

At (706), the method 700 can include determining a location of a vehicle (and/or other computing system) based at least in part on the sensor data and the sparse geographic data. The vehicle computing system 105 (and/or other computing system) can determine a location of the vehicle (and/or other computing system) within the surrounding environment based at least in part on the sensor data 145 indicative of the one or more geographic cues and the sparse geographic data. For instance, the vehicle computing system (and/or other computing system) 105 can generate transformed sensor data based at least in part on the sensor data 145 indicative of the one or more geographic cues. As described herein, this can include generating a cropped portion of the sensor data 145 that is indicative of the one or more geographic cues and rotating, translating, etc. the cropped portion of the sensor data 145. The vehicle computing system 105 (and/or other computing system) can determine a comparison of the transformed sensor data to a sub-portion of the sparse geographic data (e.g., at one or more iterations, positions, angles, etc.). For example, the vehicle computing system 105 (and/or other computing system) can perform a convolution for the transformed sensor data over the sub-portion of the sparse geographic data.

The vehicle computing system 105 (and/or other computing system) can determine the location of the vehicle 110 (and/or other computing system) within the surrounding environment based at least in part on the comparison of the transformed sensor data to the sub-portion of the sparse geographic data. For example, the vehicle computing system 105 (and/or other computing system) can determine a plurality of probabilities (e.g., probability scores) for a plurality of candidate locations within the surrounding environment. As described herein, each probability can be indicative of a likelihood that the vehicle 110 (and/or other computing system) is located at an associated candidate location. The vehicle computing system 105 (and/or other computing system) can select the location from the plurality of candidate locations based at least in part on the plurality of probabilities. For example, the vehicle computing system 105 (and/or other computing system) can select the candidate location with the highest probability score, determine an average sum of the probabilities at two or more of the candidate locations, and/or employ other statistical analysis techniques.

In some implementations, the vehicle computing system 105 (and/or other computing system) can utilize one or more machine-learned models to determine the location of the vehicle 110. For instance, the vehicle computing system 105 (and/or other computing system) can detect the one or more geographic cues based at least in part on the sensor data 145 and a first machine-learned model (e.g., a first convolutional neural network). In some implementations, the vehicle computing system 105 (and/or other computing system) can generate transformed sensor data based at least in part on the sensor data 145 indicative of the one or more geographic cues and the first machine-learned model. In some implementations, the vehicle computing system 105 (and/or other computing system) can generate transformed sparse geographic data based at least in part on the sparse geographic data indicative of the one or more geographic cues and a second machine-learned model (e.g., a second convolutional neural network). The vehicle computing system 105 (and/or other computing system) can determine a comparison of the transformed sensor data to the sparse geographic data (and/or the transformed sparse geographic data, if available). The vehicle computing system 105 (and/or other computing system) can determine the location of the vehicle 110 within the surrounding environment based at least in part on the comparison of the transformed sensor data to the sparse geographic data (and/or the transformed sparse geographic data, if available).

At (708), the method 700 can include outputting the data indicative of the location of the vehicle (and/or other computing system). For instance, the vehicle computing system 105 (and/or other computing system) can output data indicative of the location of the vehicle 110 (and/or other computing system) within the surrounding environment. In some implementations, as described herein, the data indicative of the location of the vehicle 110 can be provided to one or more systems onboard the vehicle 110 (e.g., of the autonomy system 135) and/or to one or more systems that are remote from the vehicle 110 (e.g., the operations computing system 115). In some implementations, a computing system (e.g., user device) can output data indicative of the location of the computing so that it can be utilized by a localization system of the computing system (e.g., for determining user device location).

At (710), the method 700 can include determining a vehicle action based at least in part on the location of the vehicle. For instance, the vehicle computing system 105 can determine one or more vehicle actions to be performed by the vehicle 110 based at least in part on the location of the vehicle 110. The vehicle computing system 105 can cause the vehicle 110 to initiate the one or more vehicle actions, at (712). As described herein, this can include a variety of actions such as, for example, object perception, object motion prediction, motion planning, remote reporting of the vehicle's location, etc. By way of example, the vehicle computing system 105 can determine a motion plan 185 (e.g., a vehicle trajectory, speed, etc.) for the vehicle 110 based at least in part on the location of the vehicle 110 within the surrounding environment (as determined by the lightweight localization techniques of the present disclosure). The vehicle computing system 105 can cause the vehicle 110 to initiate travel in accordance with at least a portion of the motion plan 185 (e.g., the planned a vehicle trajectory, speed, etc.). In implementations, within the context of other computing systems, the method can include initiating actions associated with the computing system (e.g., localizing the user device for user discovery, etc.).

Figure 8:
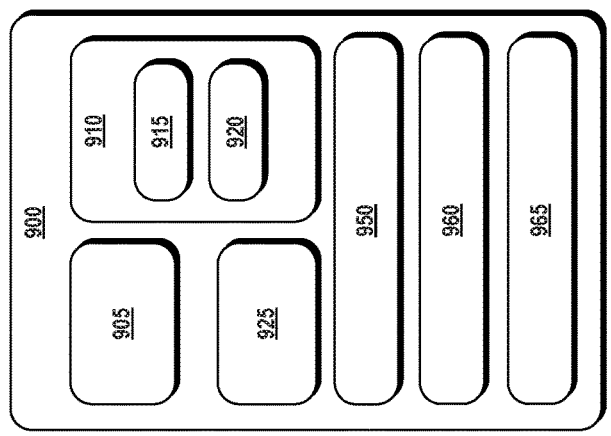
FIG. 8 depicts example system components according to example embodiments of the present disclosure.
Figure 8:
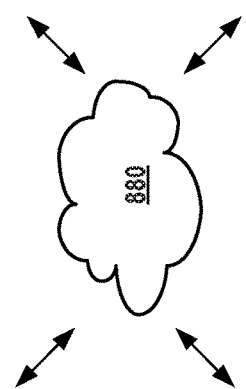
Figure 8:
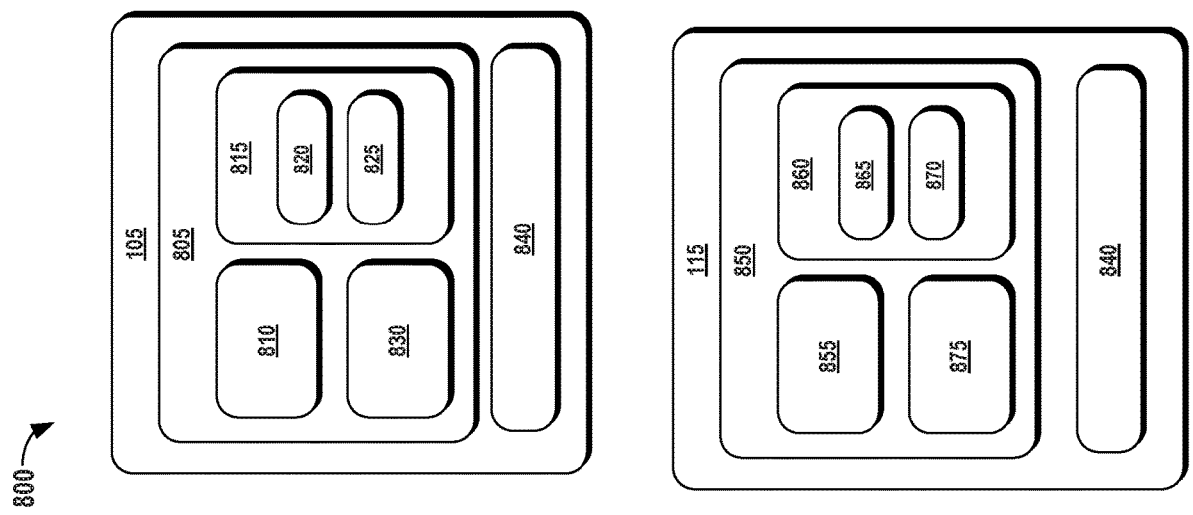

FIG. 8 depicts example system components of an example system 800 according to example embodiments of the present disclosure. The example system 800 can include the vehicle computing system 105, the operations computing system 115, and a machine learning computing system 900 that are communicatively coupled over one or more network(s) 880.

The vehicle computing system 105 can include one or more computing device(s) 805. The computing device(s) 805 of the vehicle computing system 105 can include processor(s) 810 and a memory 815 (e.g., onboard the vehicle 110). The one or more processors 810 can be any suitable processing device (e.g., a processor core, a microprocessor, an ASIC, a FPGA, a controller, a microcontroller, etc.) and can be one processor or a plurality of processors that are operatively connected. The memory 815 can include one or more non-transitory computer-readable storage media, such as RAM, ROM, EEPROM, EPROM, one or more memory devices, flash memory devices, etc., and combinations thereof.

The memory 815 can store information that can be accessed by the one or more processors 810. For instance, the memory 815 (e.g., one or more non-transitory computer-readable storage mediums, memory devices) can include computer-readable instructions 820 that can be executed by the one or more processors 810. The instructions 820 can be software written in any suitable programming language or can be implemented in hardware. Additionally, or alternatively, the instructions 820 can be executed in logically and/or virtually separate threads on processor(s) 810.

For example, the memory 815 can store instructions 820 that when executed by the one or more processors 810 cause the one or more processors 810 (the computing system 805) to perform operations such as any of the operations and functions of the vehicle computing system 105, the vehicle 110, or for which the vehicle computing system 105 and/or the vehicle 110 are configured, as described herein, the operations for vehicle localization (e.g., one or more portions of method 700), and/or any other functions for the vehicle computing system 102, as described herein.

The memory 815 can store data 825 that can be obtained (e.g., received, retrieved, accessed, written, manipulated, created, stored, etc.). The data 825 can include, for instance, sensor data, perception data, prediction data, motion planning data, data indicative of heuristics and functions (e.g., for detecting lanes, transforming data, matching data, etc.), data indicative of machine-learned models, data associated with geographic cue(s), sparse geographic data, data indicative of vehicle parameter(s), data indicative of determined vehicle locations, and/or other data/information described herein. In some implementations, the computing device(s) 805 can obtain data from one or more memories that are remote from the vehicle 110.

The computing device(s) 805 can also include a communication interface 830 used to communicate with one or more other system(s) on-board the vehicle 110 and/or a remote computing device that is remote from the vehicle 110 (e.g., the other systems of FIG. 8, etc.). The communication interface 830 can include any circuits, components, software, etc. for communicating via one or more networks (e.g., 880). In some implementations, the communication interface 830 can include, for example, one or more of a communications controller, receiver, transceiver, transmitter, port, conductors, software and/or hardware for communicating data/information.

The operations computing system 115 can be located remotely from the vehicle 110. For example, the operations computing system 115 can operate offline, off-board, etc. The operations computing system 115 can include one or more distinct physical computing devices.

The operations computing system 115 can include one or more computing devices 850. The one or more computing devices 850 can include one or more processors 855 and a memory 860. The one or more processors 855 can be any suitable processing device (e.g., a processor core, a microprocessor, an ASIC, a FPGA, a controller, a microcontroller, etc.) and can be one processor or a plurality of processors that are operatively connected. The memory 860 can include one or more non-transitory computer-readable storage media, such as RAM, ROM, EEPROM, EPROM, one or more memory devices, flash memory devices, etc., and combinations thereof.

The memory 860 can store information that can be accessed by the one or more processors 855. For instance, the memory 860 (e.g., one or more non-transitory computer-readable storage mediums, memory devices) can store data 865. The data 865 can include, for instance, data indicative of model(s), data associated with vehicle(s), and/or any other data or information described herein. In some implementations, the operations computing system 115 can obtain data from one or more memories that are remote from the operations computing system 115.

The memory 860 can also store computer-readable instructions 870 that can be executed by the one or more processors 855. The instructions 870 can be software written in any suitable programming language or can be implemented in hardware. Additionally, or alternatively, the instructions 870 can be executed in logically and/or virtually separate threads on processor(s) 855. For example, the memory 860 can store instructions 870 that when executed by the one or more processors 855 cause the one or more processors 855 to perform any of the operations and/or functions of the operations computing system 115 and/or other operations and functions.

The computing device(s) 850 can also include a communication interface 875 used to communicate with one or more other system(s). The communication interface 875 can include any circuits, components, software, etc. for communicating via one or more networks (e.g., 880). In some implementations, the communication interface 875 can include for example, one or more of a communications controller, receiver, transceiver, transmitter, port, conductors, software and/or hardware for communicating data/information.

According to an aspect of the present disclosure, the vehicle computing system 105 and/or the operations computing system 115 can store or include one or more machine-learned models 840. As examples, the machine-learned models 840 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks. The machine-learned models 840 can include the model(s) 505, 520 as described herein.

In some implementations, the vehicle computing system 105 and/or the operations computing system 115 can receive the one or more machine-learned models 840 from the machine learning computing system 900 over the network(s) 880 and can store the one or more machine-learned models 840 in the memory of the respective system. The vehicle computing system 105 and/or the operations computing system 115 can use or otherwise implement the one or more machine-learned models 840 (e.g., by processor(s) 810, 855). In particular, the vehicle computing system 105 and/or the operations computing system 115 can implement the machine learned model(s) 840 to localize a vehicle within its surrounding environment, as described herein.

The machine learning computing system 900 can include one or more processors 905 and a memory 910. The one or more processors 905 can be any suitable processing device (e.g., a processor core, a microprocessor, an ASIC, a FPGA, a controller, a microcontroller, etc.) and can be one processor or a plurality of processors that are operatively connected. The memory 910 can include one or more non-transitory computer-readable storage media, such as RAM, ROM, EEPROM, EPROM, one or more memory devices, flash memory devices, etc., and/or combinations thereof.

The memory 910 can store information that can be accessed by the one or more processors 905. For instance, the memory 910 (e.g., one or more non-transitory computer-readable storage mediums, memory devices, etc.) can store data 915 that can be obtained (e.g., generated, retrieved, received, accessed, written, manipulated, created, stored, etc.). In some implementations, the machine learning computing system 900 can obtain data from one or more memories that are remote from the machine learning computing system 900.

The memory 910 can also store computer-readable instructions 920 that can be executed by the one or more processors 905. The instructions 920 can be software written in any suitable programming language or can be implemented in hardware. Additionally, or alternatively, the instructions 920 can be executed in logically and/or virtually separate threads on processor(s) 905. The memory 910 can store the instructions 920 that when executed by the one or more processors 905 cause the one or more processors 905 to perform operations. The machine learning computing system 900 can include a communication system 925, including devices and/or functions similar to that described with respect to the computing system(s) 105, 115.

In some implementations, the machine learning computing system 900 can include one or more server computing devices. If the machine learning computing system 900 includes multiple server computing devices, such server computing devices can operate according to various computing architectures, including, for example, sequential computing architectures, parallel computing architectures, or some combination thereof.

In addition or alternatively to the model(s) 940 at the computing system(s) 105, 115, the machine learning computing system 900 can include one or more machine-learned models 950. As examples, the machine-learned models 950 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 950 can be similar to and/or the same as the machine-learned models 840, 505, 520.

As an example, the machine learning computing system 900 can communicate with the computing system(s) 105, 115 according to a client-server relationship. For example, the machine learning computing system 900 can implement the machine-learned models 950 to provide a web service to the computing system(s) 105, 115 (e.g., including on a vehicle, implemented as a system remote from the vehicle, etc.). For example, the web service can provide machine-learned models to an entity associated with a vehicle; such that the entity can implement the machine-learned model (e.g., to detect lane boundaries, localize vehicles, etc.). Thus, machine-learned models 950 can be located and used at the computing system(s) 105, 115 (e.g., on the vehicle, at the operations computing system, etc.) and/or the machine-learned models 950 can be located and used at the machine learning computing system 900.

In some implementations, the machine learning computing system 900 and/or the computing system(s) 105, 115 can train the machine-learned models 940 and/or 950 through use of a model trainer 960. The model trainer 960 can train the machine-learned models 940 and/or 950 using one or more training or learning algorithms. One example training technique is backwards propagation of errors. In some implementations, the model trainer 960 can perform supervised training techniques using a set of labeled training data. In other implementations, the model trainer 960 can perform unsupervised training techniques using a set of unlabeled training data. The model trainer 960 can perform a number of generalization techniques to improve the generalization capability of the models being trained. Generalization techniques include weight decays, dropouts, or other techniques.

The model trainer 960 can utilize loss function(s) to train the machine-learned model(s) 940 and/or 950. The model(s) 940 and/or 950 can be trained using standard back-propagation. For example, an objective function that includes a pixel-wise regression loss and a cross-entropy loss. The regression loss can minimize the Euclidean distance between the ground-truth inverse truncated distance transform and the output of lane detection network. A softmax objective can encourage the probability of the ground truth pose to be as high as possible.

The model trainer 960 can train a machine-learned model 940 and/or 950 based on a set of training data 965. The training data 965 can include, for example, ground truth data (e.g., sensor data, lane graph, etc.). The training data 965 can include training sensor data such as, for example, LIDAR point cloud(s) as well as training sparse geographic data (e.g., training lane graphs). The LIDAR point cloud(s) can be captured at a variety of rates (e.g., 10 fps, etc.). The environments utilized for training (e.g., highway scenarios, urban scenarios, rural scenarios, etc.) can be partitioned into consecutive and non-overlapping portions (e.g., stretches of 10 km), each of which corresponding to a certain split (e.g., train/val/test). Training regions can be uniformly sampled (e.g., into 50K frames, etc.) based on their geographic coordinates to train the model(s). The ground truth can be automatically generated given the vehicle pose and the sparse geographic data (e.g., the lane graph). A particular mini-batch size (e.g., of 16, etc.), an optimizer, and a set learning rate (e.g., 1e-4, etc.) can be used during the training process. Moreover, the model(s) 940, 950 can be trained with gaussian initialization and converged roughly after a certain time (e.g., 10 epochs, etc.). Ultimately, the training can be performed to evaluate (1) whether the model(s) 940, 950 are predicting that the vehicle is in the correct area (e.g., lane); (2) the distance of the prediction with respect to a geographic cue (e.g., a lane boundary); and (3) how far is the prediction from the ground truth?

In some implementations, the training data 965 can be taken from the same vehicle as that which utilizes that model 940, 950. Accordingly, the models 940, 950 can be trained to determine outputs in a manner that is tailored to that particular vehicle. Additionally, or alternatively, the training data 962 can be taken from one or more different vehicles than that which is utilizing that model 940/950. The model trainer 960 can be implemented in hardware, firmware, and/or software controlling one or more processors. In some implementations, the machine-learned models 940, 950 can be trained on training data generated by implementations of the present disclosure described herein which do not include machine-learned models.

The network(s) 880 can be any type of network or combination of networks that allows for communication between devices. In some embodiments, the network(s) 880 can include one or more of a local area network, wide area network, the Internet, secure network, cellular network, mesh network, peer-to-peer communication link and/or some combination thereof and can include any number of wired or wireless links. Communication over the network(s) 880 can be accomplished, for instance, via a network interface using any type of protocol, protection scheme, encoding, format, packaging, etc.

FIG. 8 illustrates one example system 800 that can be used to implement the present disclosure. Other computing systems can be used as well. For example, in some implementations, the one or more of the computing system(s) 105, 115 can include the model trainer 960 and the training dataset 965. In such implementations, the machine-learned models 940 can be both trained and used locally at the computing system(s) 105, 115 (e.g., at a vehicle, remote from the vehicle).

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for autonomous vehicle localization, comprising: obtaining, by a computing system that comprises one or more computing devices onboard an autonomous vehicle, sensor data indicative of one or more geographic cues within a surrounding environment of the autonomous vehicle; obtaining, by the computing system, sparse geographic data associated with the surrounding environment of the autonomous vehicle, wherein the sparse geographic data is indicative of the one or more geographic cues; generating, by the computing system, transformed sensor data based at least in part on the sensor data indicative of the one or more geographic cues and a first machine-learned model; generating, by the computing system, transformed sparse geographic data based at least in part on the sparse geographic data indicative of the one or more geographic cues and a second machine-learned model; determining, by the computing system, a comparison of the transformed sensor data to the transformed sparse geographic data; determining, by the computing system, a location of the autonomous vehicle within the surrounding environment based at least in part on the comparison of the transformed sensor data to the transformed sparse geographic data, and outputting, by the computing system, data indicative of the location of the autonomous vehicle within the surrounding environment.

2. The computer-implemented method of claim 1, wherein the sparse geographic data is generated by the autonomous vehicle in at least near real-time as the autonomous vehicle is travelling.

3. The computer-implemented method of claim 1, wherein the one or more geographic cues comprise one or more lane boundaries within the surrounding environment of the autonomous vehicle, wherein the sparse geographic data is indicative of a lane graph associated with the surrounding environment of the autonomous vehicle, wherein the lane graph is indicative of the one or more lane boundaries.

4. The computer-implemented method of claim 1, wherein the sensor data comprises at least one of LIDAR data or image data.

5. The computer-implemented method of claim 1, wherein obtaining the sparse geographic data associated with the surrounding environment of the autonomous vehicle comprises: obtaining, by the computing system, data indicative of one or more vehicle parameters associated with the autonomous vehicle; determining, by the computing system, a predicted location of the autonomous vehicle within the surrounding environment based at least in part on the one or more vehicle parameters; and identifying, by the computing system, a sub-portion of the sparse geographic data based at least in part on the predicted location of the autonomous vehicle within the surrounding environment.

6. The computer-implemented method of claim 1, wherein generating, by the computing system, the transformed sensor data based at least in part on the sensor data indicative of the one or more geographic cues comprises: generating, by the computing system, a cropped portion of the sensor data that is indicative of the one or more geographic cues; and rotating, by the computing system, the cropped portion of the sensor data.

7. The computer-implemented method of claim 1, wherein determining, by the computing system, the comparison of the transformed sensor data to the transformed sparse geographic data comprises: performing, by the computing system, a convolution for the transformed sensor data over the sub-portion of the transformed sparse geographic data.

8. The computer-implemented method of claim 1, wherein determining the location of the autonomous vehicle within the surrounding environment comprises: determining, by the computing system, a plurality of probabilities for a plurality of candidate locations within the surrounding environment, wherein each probability is indicative of a likelihood that the autonomous vehicle is located at an associated candidate location; and selecting, by the computing system, the location from the plurality of candidate locations based at least in part on the plurality of probabilities.

9. The computer-implemented method of claim 1, further comprising: determining, by the computing system, a motion plan for the autonomous vehicle based at least in part on the location of the autonomous vehicle within the surrounding environment; and causing, by the computing system, the autonomous vehicle to initiate travel in accordance with at least a portion of the motion plan.

10. The computer-implemented method of claim 1, wherein the one or more geographic cues comprise at least one of one or more lane boundaries, one or more traffic signs, one or more travel way curves, one or more barriers, or one or more bridges.

11. The computer-implemented method of claim 1, wherein the sparse geographic data omits all other features associated with the surrounding environment of the autonomous vehicle that are not the one or more geographic cues.

12. The computer-implemented method of claim 11, wherein the sparse geographic data is only indicative of the one or more geographic cues.

13. A computing system for autonomous vehicle localization, comprising: one or more processors; and one or more tangible, non-transitory, computer readable media that collectively store instructions that when executed by the one or more processors cause the computing system to perform operations comprising: obtaining sensor data indicative of one or more lane boundaries within a surrounding environment of the autonomous vehicle; obtaining sparse geographic data associated with the surrounding environment of the autonomous vehicle, wherein the sparse geographic data comprises a lane graph indicative of the one or more lane boundaries; generating transformed sensor data based at least in part on the sensor data indicative of one or more geographic cues and a first machine-learned model; generating transformed sparse geographic data based at least in part on the sparse geographic data comprising the lane graph and a second machine-learned model; determining a comparison of the transformed sensor data to the transformed sparse geographic data; determining a location of the autonomous vehicle within the surrounding environment based at least in part on the comparison of the transformed sensor data to the transformed sparse geographic data; and outputting data indicative of the location of the autonomous vehicle within the surrounding environment.

14. The computing system of claim 13, wherein determining the location of the autonomous vehicle within the surrounding environment comprises: determining a plurality of candidate locations within a travel lane; and selecting the location of the autonomous vehicle within the travel lane from the plurality of candidate locations.

15. The computing system of claim 13, wherein determining the comparison of the transformed sensor data to the transformed sparse geographic data lane graph comprises comparing the transformed sensor data to a transformed lane graph.

16. An autonomous vehicle comprising: one or more sensors one or more processors; and one or more tangible, non-transitory, computer readable media that collectively store instructions that when executed by the one or more processors cause the autonomous vehicle to perform operations comprising: obtaining, via the one or more sensors, sensor data indicative of one or more geographic cues within a surrounding environment of the autonomous vehicle; obtaining sparse geographic data associated with the surrounding environment of the autonomous vehicle; generating transformed sensor data based at least in part on the sensor data indicative of the one or more geographic cues and a first machine-learned model, and transformed sparse geographic data based at least in part on the sparse geographic data and a second machine-learned model; determining a comparison of the transformed sensor data to the transformed sparse geographic data; determining a location of the autonomous vehicle within the surrounding environment based at least in part on the comparison of the transformed sensor data to the transformed sparse geographic data; and outputting data indicative of the location of the autonomous vehicle within the surrounding environment.

17. The autonomous vehicle of claim 16, wherein the one or more sensors comprise a LIDAR system and one or more cameras and wherein the sensor data comprises LIDAR data acquired via the LIDAR system and image data acquired via the one or more cameras, wherein the one or more geographic cues comprise one or more lane boundaries and wherein the sparse geographic data is indicative of a lane graph associated with the surrounding environment of the autonomous vehicle, and wherein determining the location of the autonomous vehicle within the surrounding environment comprises determining the location of the autonomous vehicle within a travel lane of a travel way via which the autonomous vehicle is traveling.

* * * * *